(12) United States Patent
Kishigami et al.

(10) Patent No.: US 9,134,405 B2
(45) Date of Patent: Sep. 15, 2015

(54) RADAR APPARATUS

(75) Inventors: Takaaki Kishigami, Tokyo (JP); Yoichi Nakagawa, Tokyo (JP); Hirohito Mukai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 282 days.

(21) Appl. No.: 13/811,641

(22) PCT Filed: Jul. 14, 2011

(86) PCT No.: PCT/JP2011/004028
§ 371 (c)(1),
(2), (4) Date: Jan. 22, 2013

(87) PCT Pub. No.: WO2012/014402
PCT Pub. Date: Feb. 2, 2012

(65) Prior Publication Data
US 2013/0120185 A1    May 16, 2013

(30) Foreign Application Priority Data
Jul. 29, 2010   (JP) .................................. 2010-170821

(51) Int. Cl.
G01S 13/28    (2006.01)
G01S 7/28    (2006.01)
G01S 7/285    (2006.01)

(52) U.S. Cl.
CPC .............. *G01S 13/284* (2013.01); *G01S 7/285* (2013.01); *G01S 7/2813* (2013.01); *G01S 13/288* (2013.01)

(58) Field of Classification Search
CPC ... G01S 13/288; G01S 13/325; G01S 13/284; G01S 7/2813; G01S 7/285

USPC .................. 342/70, 82, 83, 92, 146, 147, 194
See application file for complete search history.

(56) References Cited

U.S. PATENT DOCUMENTS 4,153,900 A * 5/1979 Novak et al. ................... 342/201
5,786,788 A * 7/1998 Schober et al. ............... 342/159

(Continued)

FOREIGN PATENT DOCUMENTS

CN    1767420 A    5/2006
JP    61-96482 A    5/1986

(Continued)

OTHER PUBLICATIONS

Chinese Office Action, dated Nov. 29, 2013, for corresponding Chinese Patent Application No. 2011800347651, 14 pages.

(Continued)

*Primary Examiner* — John B Sotomayor
*Assistant Examiner* — Marcus Windrich
(74) *Attorney, Agent, or Firm* — Seed IP Law Group PLLC

(57) ABSTRACT

A radar apparatus transmits a radio frequency transmission signal from a transmitter antenna in a given transmission period, and receives a signal of a reflected wave reflected by a target via a receiver antenna. The radar apparatus includes a transmission signal generator that generates a first transmission signal obtained by modifying a code having a third sub-code sequence and a fourth sub-code sequence coupled to each other in a first transmission period, and generates a second transmission period obtained by modifying a code having a fifth sub-code sequence and a sixth sub-code sequence coupled to each other in a second transmission period, and a transmitter RF unit that converts the first and second transmission signals into radio frequency transmission signals, and transmits the radio frequency transmission signals from the transmitter antenna.

14 Claims, 12 Drawing Sheets

(56) References Cited

U.S. PATENT DOCUMENTS

| | | | |
|---|---|---|---|
| 6,373,859 B1 * | 4/2002 | Jedwab et al. | 370/479 |
| 8,193,972 B2 * | 6/2012 | Hofele | 342/194 |
| 8,570,150 B1 * | 10/2013 | Bowen et al. | 340/8.1 |
| 2003/0100285 A1 * | 5/2003 | Puglia | 455/293 |
| 2003/0232612 A1 | 12/2003 | Richards et al. | |
| 2009/0073025 A1 * | 3/2009 | Inoue et al. | 342/70 |
| 2009/0092392 A1 | 4/2009 | Huang et al. | |
| 2011/0019720 A1 | 1/2011 | Fuente | |

FOREIGN PATENT DOCUMENTS

| | | | |
|---|---|---|---|
| JP | 1-303135 A | 12/1989 |
| JP | 2-196982 A | 8/1990 |
| JP | 10-268040 A | 10/1998 |
| JP | 2002-214331 A | 7/2002 |
| JP | 2004-112774 A | 4/2004 |
| JP | 2004-515935 A | 5/2004 |
| JP | 2006-173756 A | 6/2006 |
| JP | 2009-95025 A | 4/2009 |

OTHER PUBLICATIONS

International Search Report, mailed Aug. 16, 2011, for International Application No. PCT/JP2011/004028, 4 pages.

* cited by examiner

FIG. 2

```
METHOD OF GENERATING COMPLEMENTARY CODES a AND b WITH CODE LENGTH L = 2^P:
a=[1 1]; b=[1 -1];
for ii=1:P
    c=a;
    d=b;
    a=[c d];%  COUPLING OF SUB-CODES c AND d
    b=[c -d];% COUPLING OF SUB-CODE c AND -d, -d MULTIPLIES
             EACH ELEMENT OF SUB-CODE d BY -1
end
```

RADAR APPARATUS

TECHNICAL FIELD

The present invention relates to a radar apparatus that receives a signal of a reflected wave reflected from a target by an antenna to detect the target.

BACKGROUND ART

The radar apparatus is configured to radiate an electric wave from a measurement point toward a space, and receive a reflected wave reflected by the target to measure a range and a direction from the measurement point to the target. In particular, in recent years, there has been advanced the development of the radar apparatuses which can detect not only automobiles but also pedestrians as the targets by measurement with high resolution using electric waves short in wavelength such as microwaves or millimeter waves.

The radar apparatus receives received signals in which the reflected waves from a short-range target and a long-range target are mixed together. In particular, in the case where a range sidelobe occurs due to autocorrelation characteristics of the signal of the reflected wave from the short-range target, the range sidelobe is mixed with the signal of the reflected wave from the long-range target when the radar apparatus receives the signals. Accordingly, a detection precision of the long-range target in the radar apparatus may be deteriorated.

Also, when the automobile and the pedestrian are present at the same distance from the measurement point, the radar apparatus may receive the received signal in which the reflected waves from the automobile and the pedestrian different in radar cross section (RCS) are mixed together. It is said that the radar cross section of the pedestrian (person) is lower than the radar cross section of the automobile. For that reason, even if the automobile and the pedestrian are present at the same distance from the measurement point, there is a need to appropriately receive the reflected waves from not only the automobile but also pedestrian.

Accordingly, there is a need to transmit a pulse wave or a pulse modulated wave having characteristics (hereinafter referred to as "low range sidelobe characteristics") in which the range sidelobe level becomes low during transmission to the above-mentioned radar apparatus where the high-resolution measurement is required. Further, the radar apparatus is required to provide a wide receiver dynamic range for the received signal.

For the above-mentioned low range sidelobe characteristics, a pulse-compression radar has been known up to now, which transmits a complementary code as the pulse wave or the pulse modulated wave having the low range sidelobe characteristic. The pulse compression represents a technique in which a signal wide in the pulse width in which a pulse signal is subjected to pulse modulation or phase modulation is transmitted, and in signal processing after receiving the signal, the received signal is demodulated and converted into a signal narrow in the pulse width. With the pulse compression, a sensing range of the target can be increased, and a distance estimate precision in the sensing distance can be improved.

Also, the complementary code includes a plurality of, for example, two complementary code sequences ($a_n$, $b_n$). In an autocorrelation operation result of one complementary code sequence and an autocorrelation operation result of the other complementary code sequence, the complementary code has a property that the range sidelobe becomes zero when delay times (shift times) $\tau$ are matched with each other to add the respective autocorrelation operation results together. A parameter n is n=1, 2, ..., L, and a parameter L represents a code sequence length.

The property of the above complementary code will be described with reference to FIG. 9. FIG. 9 is an illustrative view illustrating the property of a conventional complementary code. FIG. 9(a) is an illustrative view illustrating the autocorrelation operation result of one complementary code sequence $a_n$. FIG. 9(b) is an illustrative view illustrating the autocorrelation operation result of the other complementary code sequence $b_n$. FIG. 9(c) is an illustrative view illustrating an added value of the autocorrelation operation results of the two complementary code sequences ($a_n$, $b_n$).

The autocorrelation operation result of one complementary code sequence $a_n$ of the two complementary code sequences ($a_n$, $b_n$) is derived from Expression (1). The autocorrelation operation result of the other complementary code sequence $b_n$ is derived from Expression (2). A parameter R represents the autocorrelation operation result. When n>L or n<1 is satisfied, both of the two complementary code sequences ($a_n$, $b_n$) are set to zero. An asterisk * represents a complex conjugate operator.

[Ex. 1]

$$R_{aa}(\tau) = \sum_{n=1}^{L} a_n a_{n+t}^* \tag{1}$$

[Ex. 2]

$$R_{bb}(\tau) = \sum_{n=1}^{L} b_n b_{n+t}^* \tag{2}$$

As illustrated in FIG. 9(a), a autocorrelation operation result $R_{aa}(\tau)$ of one complementary code sequence $a_n$ derived from Expression (1) is peaked when the delay time $\tau$ is zero, and has the range sidelobe when the delay time (shift time) $\tau$ is not zero. Likewise, as illustrated in FIG. 9(b), a autocorrelation operation result $R_{bb}(\tau)$ of the other complementary code sequence $b_n$ derived from Expression (2) is peaked when the delay time $\tau$ is zero, and has the range sidelobe when the delay time $\tau$ is not zero.

As illustrated in FIG. 9(c), an added value of those autocorrelation operation results ($R_{aa}(\tau)$, $R_{bb}(\tau)$) is peaked when the delay time $\tau$ is zero, and becomes zero without any range sidelobe when the delay time $\tau$ is not zero. This is represented by Expression (3). The axis of abscissa in FIGS. 9(a) to 9(c) represents the delay time $\tau$ in the autocorrelation operation, and the axis of ordinate represents the autocorrelation operation result.

[Ex. 3]

$R_{aa}(\tau)+R_{bb}(\tau)\neq 0$, when $\tau=0$ $R_{aa}(\tau)+R_{bb}(\tau)=0$, when $\tau\neq 0$ (3)

Also, a pulse compression transmitting/receiving device and a pulse compression transmission/reception method disclosed in Patent Literature 1 have been known as the above-described conventional pulse compression radar using pulse compression.

In Patent Literature 1, the transmitting device transmits a pulse having a width T which has been subjected to pulse phase modulation in one of the complementary sequences, and a pulse having the width T which has been subjected to pulse phase modulation in the other complementary sequence, at a time interval w which is equal to or larger than the transmission pulse width T. Further, the transmitting device transmits the double transmission pulses every PRI (pulse repetitive interval) after having receiving the reflected pulses of those double transmission pulses. A correlator of the receiving device obtains a correlation between a signal of the first time interval T of the received signal of a time interval (2T+w), and a reference signal that has been modulated by one complementary sequence used for modulation of a first transmission pulse.

Further, the correlator of the receiving device obtains a correlation between the signal of the last time interval T, and a reference signal that has been modulated by the other complementary sequence. A determiner of the received signal determines a correlation value according to the two correlation results obtained by the correlator. As a result, the range sidelobe where the received signal is not subjected to phase modulation attributable to the Doppler frequency is set to zero, and the deterioration of the range sidelobe level where the received signal is subjected to the phase modulation attributable to the Doppler frequency can be reduced.

Also, there has been known a property that the attenuation of the signal of the reflected wave long in arrival time from the long-range target is larger than that of the reflected wave short in the arrival time from the short-range target from the measurement point. In order that the radar apparatus has a large receiver dynamic range, there has been known that the signal of the reflected wave is amplified by an AGC (auto gain control) unit with respect to the reflected wave from the target in association with the above-mentioned property. This will be described with reference to FIG. 10.

FIG. 10 is an illustrative view illustrating the operation of amplifying the signal of the reflected wave in the conventional radar apparatus. FIG. 10(*a*) is an illustrative view illustrating a transmission zone of the transmission signal and a measurement zone of the received signal. FIG. 10(*b*) is an illustrative view illustrating a change in a gain that is amplified by the AGC unit within the measurement zone of the received signal.

FIG. 10(*a*) illustrates an example in which the measurement zone of the reflected wave of the pulse signal is provided in a zone corresponding to a non-transmission zone when the pulse signal is intermittently transmitted in a transmission period including the transmission zone and the non-transmission zone. In this case, as illustrated in FIG. 10(*b*), the gain of the AGC unit is increased more as an elapsed time from the non-transmission zone is longer. As a result, the large receiver dynamic range can be realized in the radar apparatus.

CITATION LIST

Patent Literature

Patent Literature 1: JP-A-10-268040

SUMMARY OF THE INVENTION

Technical Problem

However, in the conventional radar apparatus, after the signal of the reflected wave reflected by the target has been subjected to quadrature detection, when an in-phase signal and a quadrature signal converted by the quadrature detection are amplified by the respective AGC units, the gain may be varied between the respective AGC units. This will be described with reference to FIG. 11. FIG. 11 is a block diagram illustrating an internal configuration of a radar receiver 50*a* in the conventional radar apparatus. In the following description, the in-phase signal of the signal that has been subjected to the quadrature detection by the radar receiver of the radar apparatus is called "I signal", and the quadrature signal of the quadrature detected signal is called "Q signal".

In FIG. 11, an AGC unit 52 amplifies an I signal output after the quadrature detection by a receiver RF unit 51 with a given gain. An AGC unit 53 amplifies a Q signal output after the quadrature detection by the receiver RF unit 51 with a given gain. The I signal that has been amplified by the AGC unit 52 is input to an A/D converter 55, and the Q signal amplified by the AGC unit 53 is input to an A/D converter 56. The I signal and the Q signal which have been input to the respective A/D converters 55 and 56 are processed by a signal processor 54 to compute a range and an arrival angle to the target.

Ideally, the gains are not varied between the AGC unit 52 and the AGC 53. However, really, the gains are varied between the AGC unit 52 and the AGC 53 according to an individual difference of respective AGC circuit elements configuring the AGC unit 52 and the AGC 53. In this case, the amplitude is different between the I signal and the Q signal, and an estimate precision in the arrival angle of the target computed in the signal processor 54 is deteriorated. This will be described with reference to FIG. 12.

FIG. 12 is an illustrative view illustrating an influence of the variation of the gains in the AGC units in the conventional radar apparatus. Referring to FIG. 12, a difference occurs between an angle when the respective AGC units 52 and 53 ideally occur, and an angle when the gains of the AGC unit 52 and the AGC 53 are varied. In this case, the amplitude is different between the I signal and the Q signal. Further, the amount of phase shift occurs between the phase component of the I signal and the phase component of the Q signal. The amount of phase shift is an error that cannot be ignored when the arrival angle of the target is estimated by an arrival angle estimation unit 63 of the signal processor 54. Accordingly, when the amount of phase shift occurs, it is difficult to estimate the arrival angle of the target with high precision.

When the above variation of the gains between the AGC unit 52 and the AGC 53 is corrected, as the conventional method, there is conceivable a technique of computing correction coefficients for correcting the variation according to the gains in advance, and saving the computed correction coefficient as a table. However, as illustrated in FIG. 10, the gains of the AGC unit 52 and the AGC 53 are changed with time. For that reason, the technique of calculating the correction coefficients corresponding to the respective gains in advance is really very troublesome. Further, there has been known that the gains of the AGC unit 52 and the AGC 53 are liable to be affected by an ambient temperature. For that reason, the correction coefficients saved in the table in advance are not always limited to appropriate values according to the values of the gains.

The present invention has been made in view of the above-mentioned conventional circumstances, and aims at providing a radar apparatus that corrects the amount of phase shift occurring between the I signal and the Q signal after quadrature detection of the signal of the reflected wave reflected by the target in real time and appropriately to suppress the deterioration of the estimate precision of the arrival angle to the target.

Means for Solving the Problems

According to the present invention, there is provided the above-mentioned radar apparatus, that is, a radar apparatus that transmits a radio frequency transmission signal from a transmitter antenna in a given transmission period, and receives a signal of a reflected wave reflected by a target by a receiver antenna, including: a transmission signal generator that generates a first transmission signal obtained by modifying a code having a third sub-code sequence and a fourth sub-code sequence coupled to each other in a first transmission period, and generates a second transmission period obtained by modifying a code having a fifth sub-code sequence and a sixth sub-code sequence coupled to each other in a second transmission period, among first and second sub-code sequences each having a sub-code length obtained by dividing a code sequence having a given code length, and third, fourth, fifth, and sixth sub-code sequences obtained by multiplying each of the first and second sub-code sequences by two kinds of different coefficients; and a transmitter RF unit that converts the first and second transmission signals generated by the transmission signal generator into radio frequency transmission signals, and transmits the radio frequency transmission signals from the transmitter antenna.

Advantageous Effects of the Invention

According to the radar apparatus of the present invention, the amount of phase shift occurring between the I signal and the Q signal after quadrature detection of the signal reflected by the target is corrected in real time and appropriately to suppress the deterioration of the estimate precision of the arrival angle to the target.

BRIEF DESCRIPTION OF DRAWINGS

FIG. 2 is an illustrative view illustrating a procedure of generating a complementary coding sequence including a sub-code sequence having a sub-code length obtained by dividing a given pulse code length.

DESCRIPTION OF EMBODIMENTS

Hereinafter, embodiments of the present invention will be described with reference to the drawings. Also, a radar apparatus according to the following embodiments will be described with the use of signals including sub-code sequences pulse-modulated by using a complementary code sequence as an example of a transmission signal. Also, in the following description, a received signal received by the radar apparatus includes a signal of a reflected wave obtained by reflecting a radio frequency transmission signal from the radar apparatus by a target, and a noise signal around the radar apparatus.

First Embodiment

Figure 1:
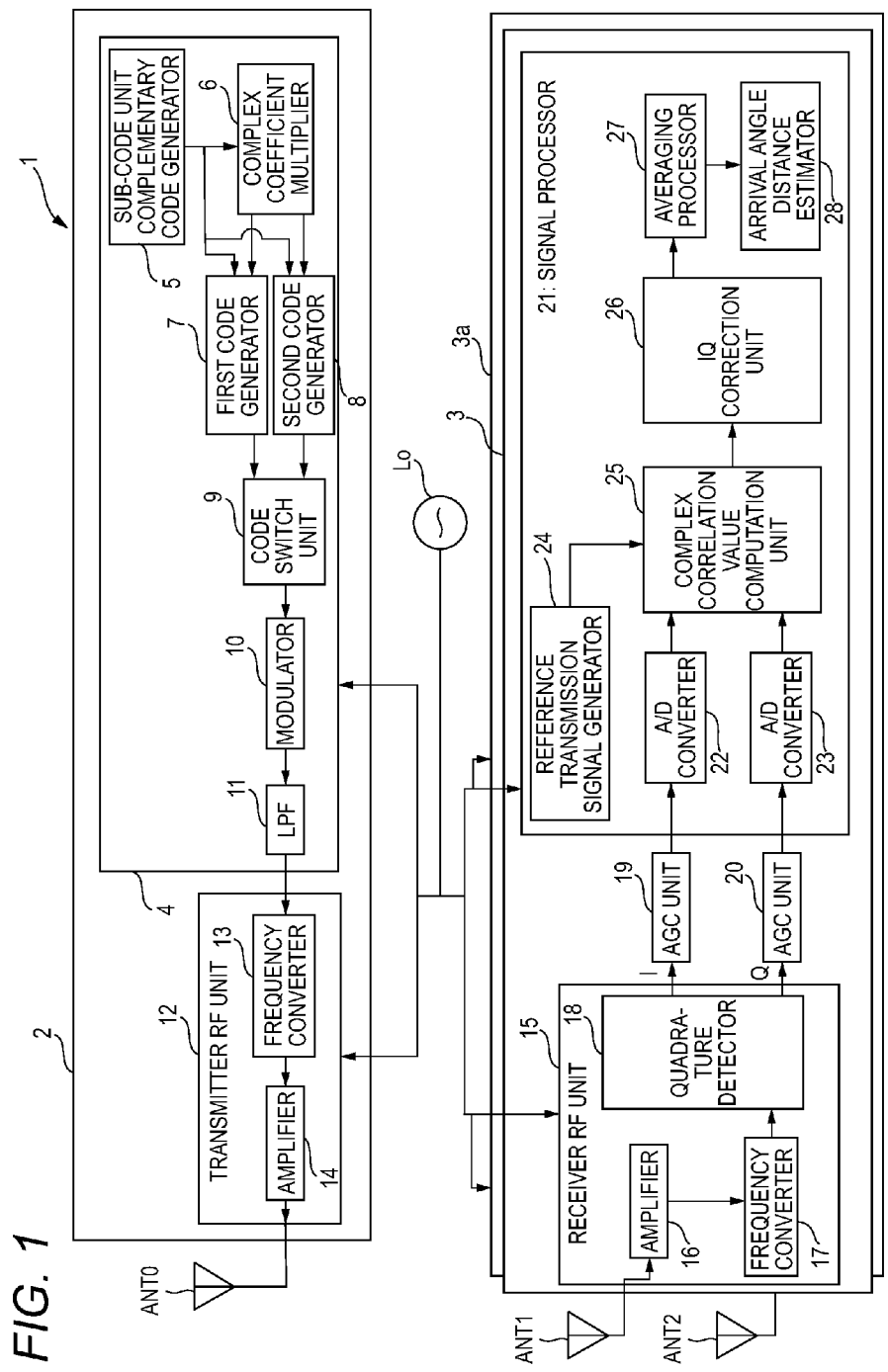
FIG. 1 is a block diagram illustrating an internal configuration of a radar apparatus according to a first embodiment.

A description will be given of a configuration and operation of a radar apparatus 1 according to a first embodiment with reference to FIGS. 1 to 5. FIG. 1 is a block diagram illustrating an internal configuration of the radar apparatus 1 according to the first embodiment. FIG. 2 is an illustrative view illustrating a procedure of generating a complementary coding sequence including a sub-code sequence having a sub-code length obtained by dividing a given pulse code length L.

Figure 3:
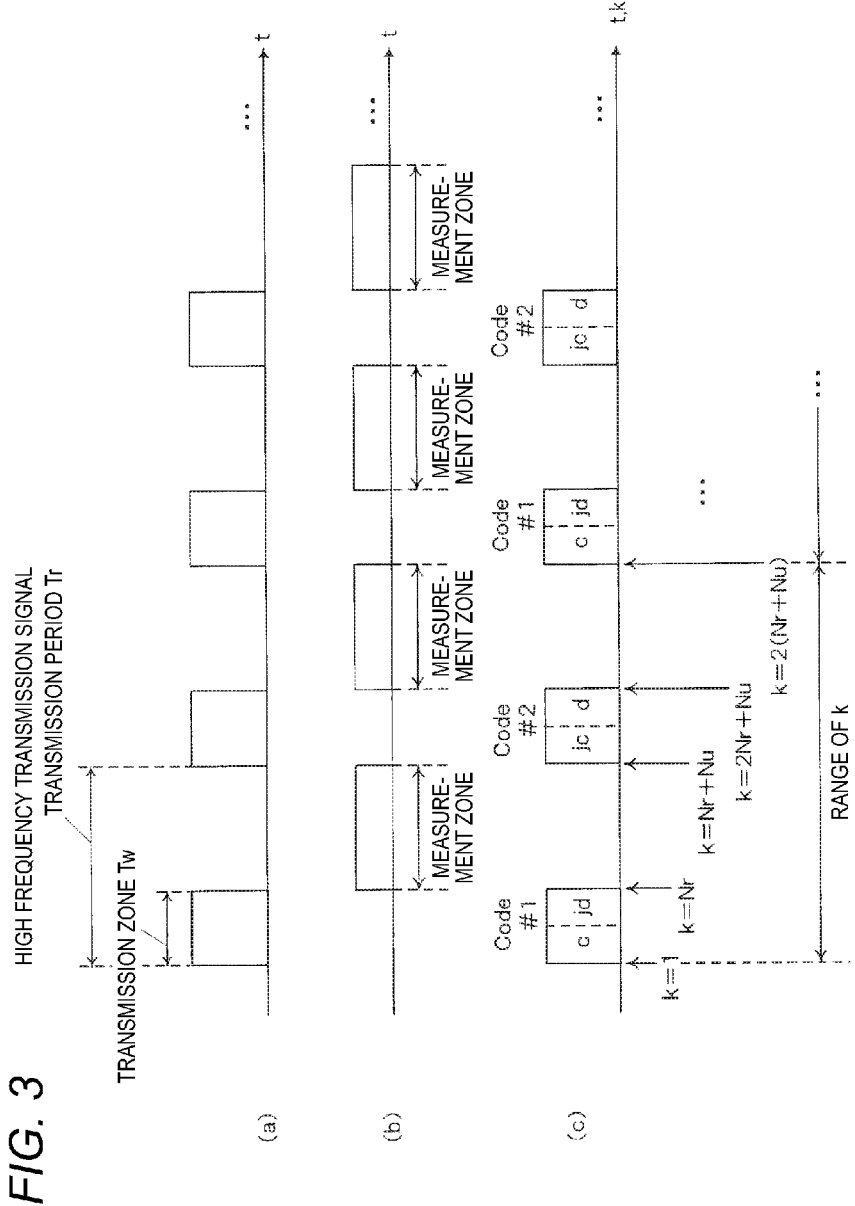
FIG. 3 is timing charts illustrating the operation of the radar apparatus according to the first embodiment, in which FIG. 3($a$) is an illustrative view of a transmission period including a transmission zone and a non-transmission zone, FIG. 3($b$) is an illustrative view of a measurement zone, and FIG. 3($c$) is an illustrative view illustrating a relationship between an appearance in which a complementary code sequence is successively switched and transmitted for each transmission period, and a discrete time.

FIG. 3 is timing charts illustrating the operation of the radar apparatus 1. FIG. 3($a$) is an illustrative view of a transmission period including a transmission zone and a non-transmission zone. FIG. 3($b$) is an illustrative view of a measurement zone. FIG. 3($c$) is an illustrative view illustrating a relationship between an appearance in which a complementary code sequence is successively switched and transmitted for each transmission period, and a discrete time.

Figure 4:
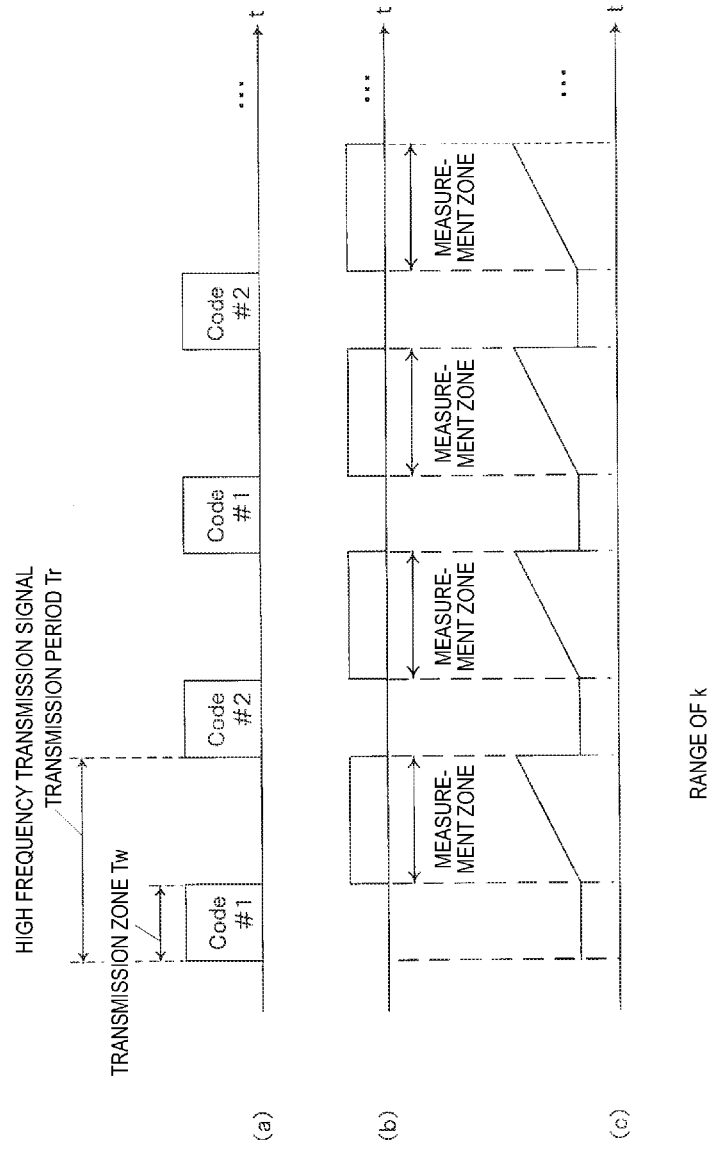
FIG. 4 is timing charts illustrating the operation of AGC units in a radar receiver, in which FIG. 4($a$) is an illustrative view illustrating an appearance in which the complementary code sequence is successively switched and transmitted for each transmission period, FIG. 4($b$) is an illustrative view of the measurement zone, and FIG. 4($c$) is an illustrative view illustrating an appearance in which gains of the AGC units are changed according to an elapsed time from a start timing of the non-transmission zone.
Figure 5:
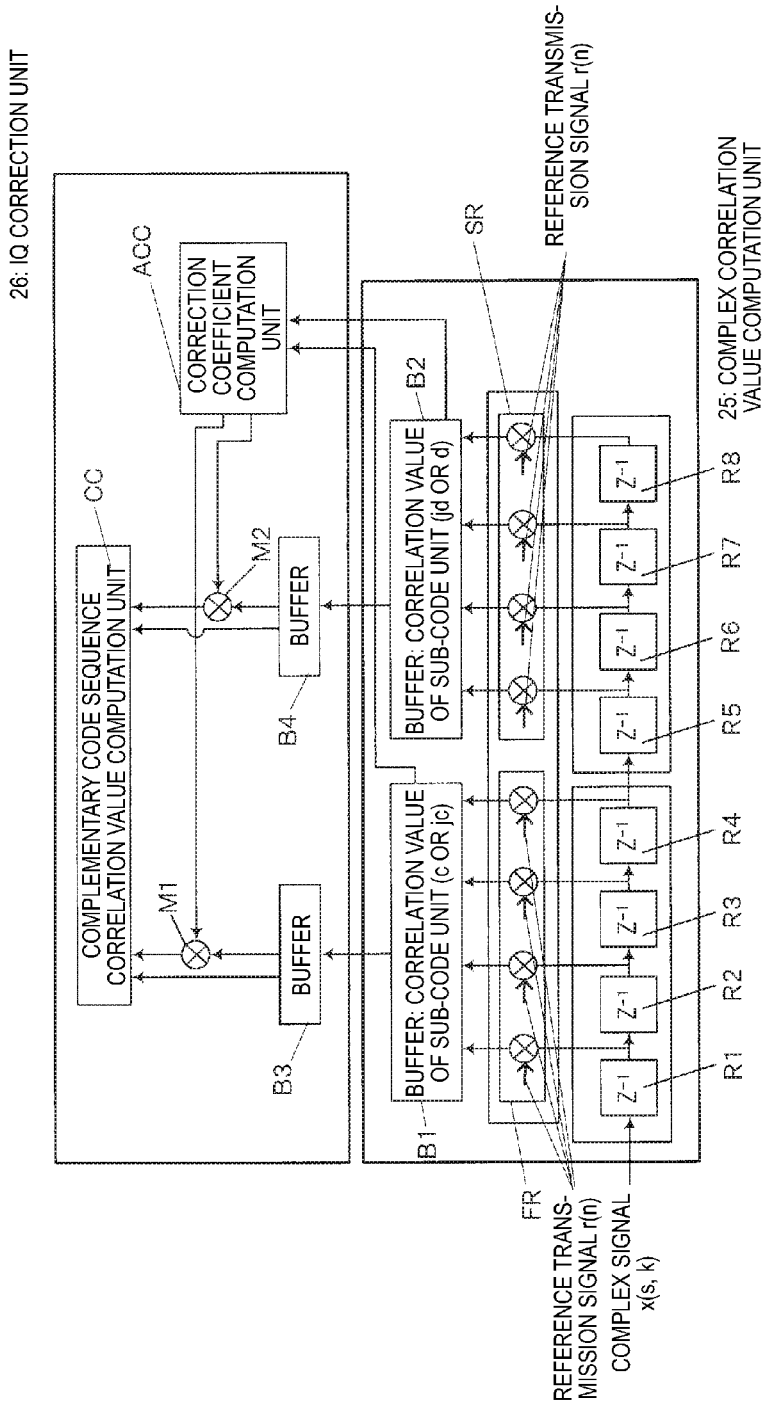
FIG. 5 is an illustrative view illustrating a configuration of a complex correlation value computation unit and an IQ correction unit.

FIG. 4 is timing charts illustrating the operation of AGC units 19 and 20 in a radar receiver 3. FIG. 4($a$) is an illustrative view illustrating an appearance in which the complementary code sequence is successively switched and transmitted for each transmission period. FIG. 4($b$) is an illustrative view of the measurement zone. FIG. 4(c) is an illustrative view illustrating an appearance in which gains of the AGC units 19 and 20 are changed according to an elapsed time from a start timing of the non-transmission zone. FIG. 5 is an illustrative view illustrating a configuration of a complex correlation value computation unit 25 and an IQ correction unit 26.

As illustrated in FIG. 1, the radar apparatus 1 includes a local oscillator Lo, a radar transmitter 2 connected with a transmitter antenna ANT0, the radar receiver 3 connected with a receiver antenna ANT1, and a radar receiver 3a connected with a receiver antenna ANT2. The radar apparatus 1 according to the first embodiment transmits a given intermittent radio frequency transmission signal generated by the radar transmitter 2 from the transmitter antenna ANT0, and receives a signal of a reflected wave reflected by a target by the radar receiver 3 and the radar receiver 3a. The radar apparatus 1 detects the target according to received signals received by the respective radar receivers 3 and 3a. The target is an object detected by the radar apparatus 1, for example, an automobile or a person, and the same is applied to the following respective embodiments.

First, the radar transmitter 2 will be described. The radar transmitter 2 includes a transmission signal generator 4 and a transmitter RF unit 12. The transmission signal generator 4 includes a sub-code unit complementary code generator 5, a complex coefficient multiplier 6, a first code generator 7, a second code generator 8, a code switch unit 9, a modulator 10, and an LPF (low pass filter) 11. Referring to FIG. 1, the transmission signal generator 4 includes the LPF 11, but the LPF 11 may be configured independently from the transmission signal generator 4. The transmitter RF unit 12 includes a frequency converter 13 and an amplifier 14.

The transmission signal generator 4 generates a timing clock obtained by multiplying a reference signal by a given multiple number on the basis of the reference signal generated by the local oscillator Lo. The respective units of the transmission signal generator 4 operate on the basis of the generated timing clock. The transmission signal generator 4 divides a complementary code sequence having a pulse code length L with L elements (1) and elements (−1) into two pieces, and modulates the respective divided sub-code sequences to periodically generate transmission signals r(n) of a baseband bandwidth. A parameter n represents a discrete time.

Also, it is assumed that the transmission signals generated by the transmission signal generator 4 are not continuous signals. For example, as illustrated in FIG. 3(a), In a zone Tw {seconds} during which the radio frequency transmission signals to be transmitted from the transmitter antenna ANT0 are present, Nr samples are present as transmission signals r(n) of the baseband bandwidth. On the other hand, it is assumed that in a zone (Tr−Tw) {seconds} during which the radio frequency transmission signals are not present, Nu samples are present as transmission signals r(n) of the baseband bandwidth. In this example, a parameter Tr is a transmission period {seconds} of the radio frequency transmission signals to be transmitted from the transmitter antenna ANT0.

The sub-code unit complementary code generator 5 generates each sub-code sequence (c, d) configuring a complementary code sequence (a, b) having a pulse code length L, and also generates the complementary code sequence (a, b) on the basis of each sub-code sequence (c, d). A code length of each sub-code sequence (c, d) is represented by L/N in which the pulse code length of the complementary code sequence (a, b) L is divided by N. Hereinafter, the code length of each sub-code sequence is called simply "sub-code length". In the following description, the operation when the number of divisions N=2 will be described.

The sub-code unit complementary code generator 5 generates the sub-code sequence (c, d) and the complementary code sequence (a, b), for example, in a procedure illustrated in FIG. 2. That is, as illustrated in FIG. 2, the sub-code unit complementary code generator 5 generates the sub-code sequence (c, d) including an element (1) or an element (−1), and also generates the complementary code sequence (a, b) having the code length of the pulse code length $L=2^p$. In this example, one complementary code sequence (a) is configured to couple a sub-code sequence (c) and a sub-code sequence (d) together. The other complementary code sequence (b) is configured to couple the sub-code sequence (c) and a sub-code sequence (−d) together.

(a, b) represents each complementary code sequence, and (c, d) represents a sub-code sequence configuring the complementary code sequence. Also, a parameter (p) determines the code length L of the complementary code sequence (a, b) generated by the sub-code unit complementary code generator 5. The sub-code unit complementary code generator 5 outputs the generated sub-code sequence (c, d) to the complex coefficient multiplier 6, the first code generator 7, and the second code generator 8.

The complex coefficient multiplier 6 receives the sub-code sequence (c, d) output from the sub-code unit complementary code generator 5, and generates a complex sub-code sequence (jc, jd) obtained by multiplying the received sub-code sequence (c, d) by a complex coefficient j. The complex coefficient multiplier 6 outputs the generated complex sub-code sequence (jc, jd) to the first code generator 7 and the second code generator 8.

The first code generator 7 receives the sub-code sequence (c, d) output from the sub-code unit complementary code generator 5, and the complex sub-code sequence (jc, jd) output from the complex coefficient multiplier 6. The first code generator 7 couples the sub-code sequence (c) and the complementary code sequence (jd) together among the respective input sub-code sequence and complementary code sequence (c, d, jc, jd) to generate a code sequence [c, jd]. The first code generator 7 outputs the generated code sequence [c, jd] to the code switch unit 9. In the following description, the code sequence generated by the first code generator 7 is stated as "Code #1".

The second code generator 8 receives the sub-code sequence (c, d) output from the sub-code unit complementary code generator 5, and the complex sub-code sequence (jc, jd) output from the complex coefficient multiplier 6. The second code generator 8 couples the sub-code sequence (d) and the complementary code sequence (jc) together among the respective input sub-code sequence and complementary code sequence (c, d, jc, jd) to generate a code sequence [jc, d]. The second code generator 8 outputs the generated code sequence [jc, d] to the code switch unit 9. In the following description, the code sequence generated by the second code generator 8 is stated as "Code #2".

The code switch unit 9 receives the code sequence Code #1 generated by the first code generator 7, and the code sequence Code #2 generated by the second code generator 8. As illustrated in FIG. 3(c), the code switch unit 9 sequentially switches the input code sequence Code #1 and the code sequence Code #2 for each transmission period Tr, and outputs the switched code sequence to the modulator 10. Specifically, in the transmission zone of a first transmission period Tr in FIG. 3(c), the code switch unit 9 outputs the code sequence Code #1 to the modulator 10. In a transmission zone of a subsequent transmission period Tr, the code switch unit 9 outputs the code sequence Code #2 to the modulator 10. Also, in transmission zones of the subsequent transmission periods, the code switch unit 9 sequentially switches the input code sequence Code #1 and the code sequence Code #2, and outputs the switched code sequence to the modulator 10, likewise.

The modulator 10 receives the code sequence Code #1 or the code sequence Code #2 output from the code switch unit 9. The modulator 10 conducts pulse modulation using samples of Nr/L for each of the code sequences on the input code sequence Code #1 or code sequence Code #2 to generate the transmission signals. Also, the modulator 10 may conduct phase modulation, which will be described later with reference to FIG. 6(b), on the input code sequence Code #1 or code sequence Code #2 to generate the transmission signals. The detail will be described later. The modulator 10 outputs only transmission signals r(n) of a predetermined limited bandwidth or lower among the generated transmission signals to the transmitter RF unit 12 through the LPF 11.

The transmitter RF unit 12 generates a timing clock obtained by multiplying the reference signal by a given multiple number, on the basis of the reference signal generated by the local oscillator Lo. The transmitter RF unit 12 operates on the basis of the generated reference signal. Specifically, the frequency converter 13 receives the transmission signal r(n) generated by the transmission signal generator 4, and conducts frequency conversion on the input transmission signal r(n) of the baseband bandwidth to generate the radio frequency transmission signal of the carrier frequency bandwidth. The frequency converter 13 outputs the generated radio frequency transmission signal to the amplifier 14.

The amplifier 14 receives the output radio frequency transmission signal, and amplifies a level of the received radio frequency transmission signal to a given level to output the amplified radio frequency transmission signal to the transmitter antenna ANT0. The amplified radio frequency transmission signal is transmitted to be radiated toward a space through the transmitter antenna ANT0.

The transmitter antenna ANT0 transmits the radio frequency transmission signal output from the transmitter RF unit 12 to be radiated toward the space. As illustrated in FIG. 3(a), the radio frequency transmission signal is transmitted during a transmission zone Tw of the transmission period Tr, and not transmitted during a non-transmission zone (Tr−Tw).

Subsequently, the radar receivers 3 and 3a will be described. The radar receiver 3 includes the receiver antenna ANT1, a receiver RF unit 15, the AGC unit 19, the AGC unit 20, and a signal processor 21. The radar receiver 3a has the same configuration as that of the radar receiver 3 except that the receiver antenna ANT1 is replaced with another receiver antenna ANT2 different from the receiver antenna ANT1. Accordingly, in the following description of the radar receivers 3 and 3a, only the radar receiver 3 will be described. The radar receiver 3a conducts the same operation as that of the radar receiver 3.

The receiver RF unit 15 includes an amplifier 16, a frequency converter 17, and a quadrature detector 18. The signal processor 21 includes an A/D converter 22, an A/D converter 23, a reference transmission signal generator 24, the complex correlation value computation unit 25, the IQ correction unit 26, an averaging processor 27, and an arrival angle distance estimator 28.

The receiver antenna ANT1 receives a signal of a reflected wave obtained by reflecting the radio frequency transmission signal transmitted from the radar transmitter 2 on the target, and a noise signal around the radar apparatus 1, as received signal. The signal of the reflected wave is a signal of the radio frequency bandwidth. The received signal received by the receiver antenna ANT1 is input to the receiver RF unit 15. As illustrated in FIG. 1, in the description, two radar receivers are provided in the radar apparatus 1 according to the first embodiment. However, the number of radar receivers is not particularly limited to two. In the radar apparatus 1, each of the radar receivers holds one receiver antenna.

As illustrated in FIG. 3(b), the receiver antenna ANT1 receives the above-mentioned received signal in a zone corresponding to the non-transmission zone (Tr−Tw) of the transmission period Tr of the radio frequency transmission signal. Accordingly, the zone during which the received signal is received is regarded as the measurement zone of the radar apparatus 1.

The receiver RF unit 15 generates the timing clock obtained by multiplying the reference signal by the given multiple number, on the basis of the reference signal generated by the local oscillator Lo. The receiver RF unit 15 operates on the basis of the generated timing clock. Specifically, the amplifier 16 receives the received signal of the radio frequency bandwidth which has been received by the receiver antenna ANT1, and amplifies a level of the input received signal of the radio frequency bandwidth to a given level to output the amplified received signal to the frequency converter 17.

The frequency converter 17 receives the received signal of the radio frequency bandwidth, which has been output from the amplifier 16, converts the frequency of the input received signal having the radio frequency bandwidth into the baseband bandwidth, and outputs the received signal of the baseband bandwidth, which has been subjected to the frequency conversion, to the quadrature detector 18.

The quadrature detector 18 phase-shifts each phase component of partial received signals of the received signals of the baseband bandwidth, which has been output from the frequency converter 17, by 90 (degrees), to thereby generate received signals of the baseband bandwidth, including an I signal and a Q signal. The quadrature detector 18 outputs the generated I signal to the AGC unit 19, and outputs the generated Q signal to the AGC unit 20.

As illustrated in FIG. 4(c), the AGC unit 19 amplifies the I signal output from the quadrature detector 18 by a gain corresponding to an elapsed time from a start timing of the measurement zone (non-transmission zone) illustrated in FIG. 4(b). A gain of the AGC unit 19 is not fixed but variable as illustrated in FIG. 4(c). The AGC unit 19 outputs the amplified I signal to the A/D converter 22.

As illustrated in FIG. 4(c), the AGC unit 20 amplifies the Q signal output from the quadrature detector 18 by a gain corresponding to an elapsed time from a start timing of the measurement zone (non-transmission zone) illustrated in FIG. 4(b). A gain of the AGC unit 20 is not fixed but variable as illustrated in FIG. 4(c). The AGC unit 20 outputs the amplified Q signal to the A/D converter 23.

The A/D converter 22 samples the I signal of the baseband bandwidth output from the AGC unit 19 at a discrete time k, to thereby convert the I signal into digital data. Likewise, the A/D converter 23 samples the Q signal of the baseband bandwidth output from the AGC unit 20 at the discrete time k, to thereby convert the Q signal into digital data. In this example, a parameter k represents a discrete time corresponding to the number of samples of the transmission signal r(n) of the baseband bandwidth included in the radio frequency transmission signal.

In this example, the received signal by the receiver antenna ANT1 at the discrete time k is represented as a complex signal of Expression (4) with the user of an in-phase signal I(s, k) of the received signal, and a quadrature signal Q(s, k) of the received signal. A parameter j is a complex coefficient that satisfies $j^2=-1$. A parameter s represents the receiver antenna ANT1 or the receiver antenna ANT2 in the radar apparatus 1 according to the first embodiment, and s=1 or s=2. The gain of the AGC unit 19 or the AGC unit 20 at the discrete time k is represented as g(k, I) or g(k, Q). When the characteristics of the AGC units 19 and 20 are ideal, if k=1 to (Nr+Nu), g(k, I)=g(k, Q) is satisfied. However, if there is a variation of the gain between the AGC units 19 and 20, g(k, I)≠g(k, Q) is satisfied.

[Ex. 4]

$$x(s,k)=g(k,I)I(s,k)+jg(k,Q)Q(s,k) \qquad (4)$$

In the following description, the discrete time k is k=1 to 2(Nr+Nu). As illustrated in FIG. 3(c), the discrete time k=1 represents a start timing of the radio frequency transmission signal in the transmission period Tr of the code sequence Code #1. Also, the discrete time k=2(Nr+Nu) represents an end timing of the radio frequency transmission signal in the transmission period Tr of the code sequence Code #2. That is, the radar receiver 3 periodically computes a zone of a double transmission period (2Tr) including the transmission period Tr of the radio frequency transmission signal of the code sequence Code #1, and the transmission period Tr of the radio frequency transmission signal of the code sequence Code #2, as a signal processing zone in the signal processor 21.

Also, as illustrated in FIG. 3(c), the discrete time k is k=1 at the transmission start timing of the radio frequency transmission signal in the code sequence Code #1, and k=Nr at the transmission end timing of the radio frequency transmission signal in the code sequence Code #1. Likewise, the discrete time k is k=(Nr+Nu) at the transmission start timing of the radio frequency transmission signal in the code sequence Code #2, and k=(2Nr+Nu) at the transmission end timing of the radio frequency transmission signal in the code sequence Code #2. Further, the discrete time k is k=2(Nr+Nu) at the end timing of the transmission period Tr in the code sequence Code #2. The discrete time k is repetitively set in a range from the transmission start timing of the radio frequency transmission signal in the code sequence Code #1 to the transmission end timing of the radio frequency transmission signal in the code sequence Code #2.

As in the transmission signal generator 4, the reference transmission signal generator 24 generates the timing clock obtained by multiplying the reference signal by a given multiple number, on the basis of the reference signal generated by the local oscillator Lo, in synchronism with the operation of the transmission signal generator 4. The reference transmission signal generator 24 periodically generates the reference transmission signal r(n) of the same baseband bandwidth as that of the transmission signal generated by the transmission signal generator 4, on the basis of the generated reference signal. The reference transmission signal generator 24 outputs the generated reference transmission signal r(n) to the complex correlation value computation unit 25.

The transmission signal generated by the transmission signal generator 4 in the radar transmitter 2 and the reference transmission signal generated by the reference transmission signal generator 24 can be represented by Expression (5) as the signal r(n) of the baseband bandwidth including an I signal Ir(k) and a Q signal Qr(k). A parameter $g_r(k)$ represents the gains of the AGC units 19 and 20 at the discrete time k.

[Ex. 5]

$$r(n)=Ir(k)+jQr(k) \qquad (5)$$

Figure 6:
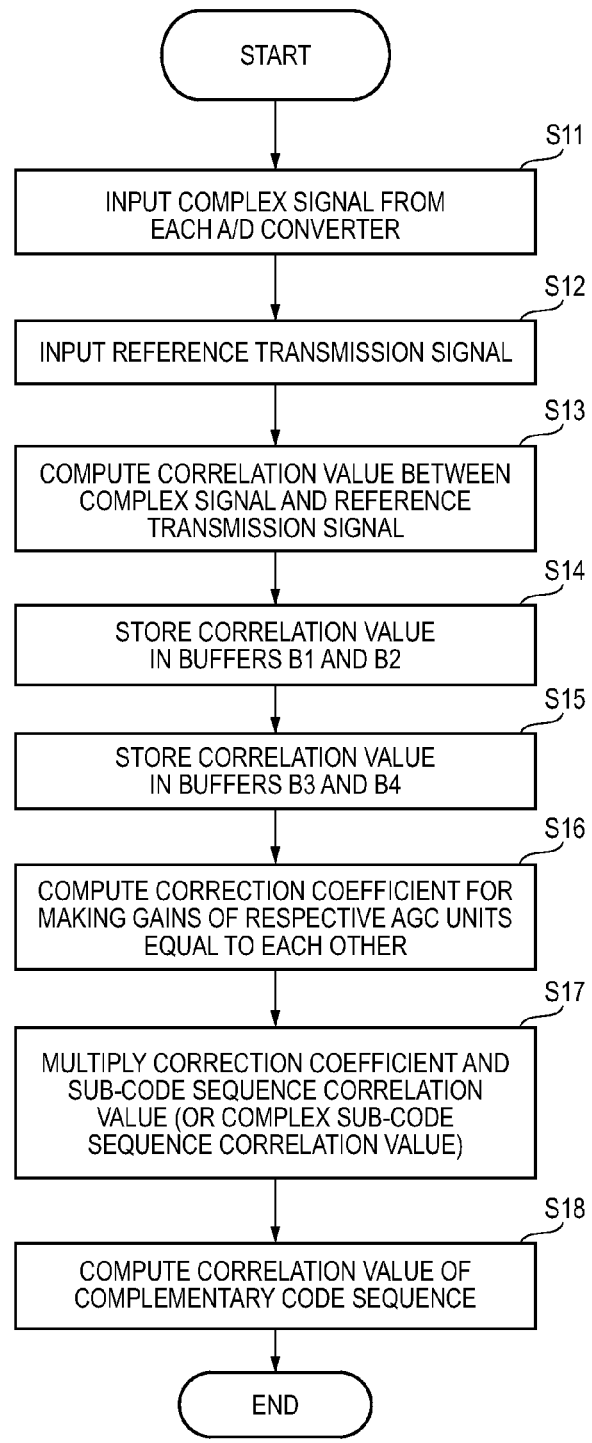
FIG. 6 is a flowchart illustrating the operation of the complex correlation value computation unit and the IQ correction unit.

The operation of the complex correlation value computation unit 25 and the IQ correction unit 26 will be described with reference to FIGS. 5 and 6. FIG. 6 is a flowchart illustrating the operation of the complex correlation value computation unit 25 and the IQ correction unit 26 at the discrete time k=1 to 2(Nr+Nu). Step S11 to Step S15 in FIG. 6 represent the operation of the complex correlation value computation unit 25, and the operation of Step S16 to Step S18 in the figure represents the operation of the IQ correction unit 26.

As illustrated in FIG. 5, the complex correlation value computation unit 25 includes a plurality of shift registers R1 to R8, a first sub-code unit correlation value computation unit FR, a second sub-code unit correlation value computation unit SR, and buffers B1, B2. The IQ correction unit 26 includes buffers B3, B4, a correction coefficient computation unit ACC, corrected correlation value computation units M1, M2, and a complementary code sequence correlation value computation unit CC.

Referring to FIG. 6, each of the respective shift registers R1 to R8 receives a complex signal x(s, k) converted by each of the A/D converters 22 and 23 (S11). FIG. 5 illustrates a configuration of the complex correlation value computation unit 25 when the pulse code length L=8 is satisfied. Each of the shift registers R1 to R8 receives the complex signal x(s, k) in correspondence with shift of a parameter m in Expressions (6) and (7) which will be described later. The parameter m represents a shift time in the computation of the correlation value. Also, the first sub-code unit correlation value computation unit FR and the second sub-code unit correlation value computation unit SR each receive the reference transmission signal r(n) output from the reference transmission signal generator 24 (S12).

In this example, when the characteristics of the AGC units 19 and 20 are ideal, gr(k)=g(k, I)=g(k, Q) is satisfied at the discrete time k=1 to 2(Nr+Nu). In this case, the first sub-code unit correlation value computation unit FR computes a correlation value of the complex signal x(s, k) input in Step S11 and a complex conjugate value of the reference transmission signal r(n) input in Step S12 as represented by Expression (6) (S13). Also, the second sub-code unit correlation value computation unit SR computes the correlation value of the complex signal x(s, k) input in Step S11 and the complex conjugate value of the reference transmission signal r(n) input in Step S12 as represented by Expression (7) (S13).

In computation of Expression (6), a zone of the discrete time k=1 to (Nr+Nu) corresponds to the transmission period of the radio frequency transmission signal in the code sequence Code #1 as illustrated in FIG. 3. Also, in computation of Expression (7), a zone of the discrete time k=(Nr+Nu+1) to 2(Nr+Nu) corresponds to the transmission period of the radio frequency transmission signal in the code sequence Code #2 as illustrated in FIG. 3. Accordingly, each of the first sub-code unit correlation value computation unit FR and the second sub-code unit correlation value computation unit SR switchingly receives the reference transmission signal r(n) output from the reference transmission signal generator 24 according to a range of the discrete time k in Step S12.

Specifically, the first sub-code unit correlation value computation unit FR receives the same reference transmission signal as the radio frequency transmission signal in the code sequence Code #1 as the reference transmission signal r(n) in the zone of the discrete time k=1 to (Nr+Nu) (S12). Also, the second sub-code unit correlation value computation unit SR receives the same reference transmission signal as the radio frequency transmission signal in the code sequence Code #2 as the reference transmission signal r(n) in the zone of the discrete time k=(Nr+Nu+1) to 2(Nr+Nu) (S12).

[Ex. 6]

$$AC_1(s, k) = \sum_{m=1}^{Nr} \frac{x(s, k + m - 1)}{g_r(k + m - 1)} r^*_{code\ \#1}(m) \quad (6)$$

[Ex. 7]

$$AC_2(s, k) = \sum_{m=1}^{Nr} \frac{x(s, k + m - 1)}{g_r(k + m - 1)} r^*_{code\ \#2}(m) \quad (7)$$

In this example, a parameter $r_{Code\#1}(m)$ in Expression (6) represents the same reference transmission signal as the radio frequency transmission signal in the code sequence Code #1 in the zone of the discrete time k=1 to (Nr+Nu). Also, likewise, a parameter $r_{Code\#2}(m)$ in Expression (7) represents the same reference transmission signal as the radio frequency transmission signal in the code sequence Code #2 in the zone of the discrete time k=(Nr+Nu+1) to 2(Nr+Nu). Also, asterisk (*) represents a complex conjugate operator.

On the other hand, if there is a variation of the gain between the AGC units 19 and 20, a parameter $g_r(k) \neq g(k, I) \neq g(k, Q)$ is satisfied. In this case, the first sub-code unit correlation value computation unit FR computes a sub-code sequence correlation value between the complex signal x(s, k) input in Step S11, for the sub-code sequence having a sub-code length L/N (L/N=4 in case of FIG. 5), and the sub-code sequence of the reference transmission signal r(n) input in Step S12 (S13). Also, the second sub-code unit correlation value computation unit SR computes a complex sub-code sequence correlation value between the complex signal x(s, k) input in Step S11, and the complex sub-code sequence of the reference transmission signal r(n) input in Step S12, for the complex sub-code sequence having a sub-code length L/N (S13).

Specifically, the first sub-code unit correlation value computation unit FR computes the sub-code sequence correlation value between the complex signal x(s, k) input in Step S11, and the sub-code sequence (c) of the reference transmission signal r(n) input in Step S12, at the discrete time k=1 to (Nr+Nu) according to Expression (8) (S13). Also, the second sub-code unit correlation value computation unit SR computes the complex sub-code sequence correlation value between the complex signal x(s, k) input in Step S11, and the complex sub-code sequence (jd) of the reference transmission signal r(n) input in Step S12, at the same discrete time k=1 to (Nr+Nu) according to Expression (9) (S13).

The first sub-code unit correlation value computation unit FR temporarily stores each sub-code sequence correlation value computed in Step S13, in the buffer B1 within the complex correlation value computation unit 25 (S14), and outputs the sub-code sequence correlation value to the buffer B3 of the IQ correction unit 26 (S15). Further, the second sub-code unit correlation value computation unit SR temporarily stores each complex sub-code sequence correlation value computed in Step S13, in the buffer B2 within the complex correlation value computation unit 25 (S14), and outputs the complex sub-code sequence correlation value to the buffer B4 of the IQ correction unit 26 (S15).

[Ex. 8]

$$AC_{1\_sub_1}(s, k) = \sum_{m=1}^{Nr} \frac{x(s, k + m - 1)}{g_r(k + m - 1)} [c(m)]^* \quad (8)$$

[Ex. 9]

$$AC_{1\_sub_2}(s, k) = \sum_{m=1}^{Nr} \frac{x(s, k + m - 1)}{g_r(k + m - 1)} [jd(m)]^* \quad (9)$$

Also, the first sub-code unit correlation value computation unit FR computes the complex sub-code sequence correlation value between the complex signal x(s, k) input in Step S11, and the complex sub-code sequence (jc) of the reference transmission signal r(n) input in Step S12, at the discrete time k=(Nr+Nu+1) to 2(Nr+Nu) according to Expression (10) (S13). Also, the second sub-code unit correlation value computation unit SR computes the sub-code sequence correlation value between the complex signal x(s, k) input in Step S11, and the complex sub-code sequence (d) of the reference transmission signal r(n) input in Step S12, at the same discrete time k=(Nr+Nu+1) to 2(Nr+Nu) according to Expression (11) (S13).

The first sub-code unit correlation value computation unit FR temporarily stores each complex sub-code sequence correlation value computed in Step S13, in the buffer B1 within the complex correlation value computation unit 25 (S14), and outputs the complex sub-code sequence correlation value to the buffer B3 of the IQ correction unit 26 (S15). Further, the second sub-code unit correlation value computation unit SR temporarily stores each sub-code sequence correlation value computed in Step S13, in the buffer B2 within the complex correlation value computation unit 25 (S14), and outputs the sub-code sequence correlation value to the buffer B4 of the IQ correction unit 26 (S15).

[Ex. 10]

$$AC_{2\_sub_1}(s, k) = \sum_{m=1}^{Nr} \frac{x(s, k + m - 1)}{g_r(k + m - 1)} [jc(m)]^* \quad (10)$$

[Ex. 11]

$$AC_{2\_sub_2}(s, k) = \sum_{m=1}^{Nr} \frac{x(s, k + m - 1)}{g_r(k + m - 1)} [d(m)]^* \quad (11)$$

Referring to FIG. 6, the correction coefficient computation unit ACC computes a correction coefficient for making the respective gains of the AGC units 19 and 20 equal to each other on the basis of the respective sub-code sequence correlation values and the respective complex sub-code sequence correlation values, which are computed by the complex correlation value computation unit 25 (S16). Specifically, the correction coefficient computation unit ACC computes a coefficient concerning Expression (8) or Expression (9) when Expression (12) is satisfied, as a first correction coefficient $H_1(s, k)$ (where k=1 to (Nr+Nu)), at the discrete time k=1 to (Nr+Nu) on the basis of the respective sub-code sequence correlation values and the respective complex sub-code sequence correlation values which are computed according to Expression (8) and Expression (9) (S16).

Specifically, the first correction coefficient $H_1(s, k)$ is computed as a coefficient for making the respective amplitude levels (amplitude scales) of a complex sub-code sequence correlation value $AC_{1\_sub_2}$ (s, k+(Nr/N)) when the complex sub-code sequence is used for the transmission signal, and a sub-code sequence correlation value $AC_{1\_sub_1}$ (s, k) when the sub-code sequence is used for the transmission signal, equal to each other. The $AC_{1\_}sub_2(s, k+(Nr/N))$ or $AC_{1\_}sub_1(s, k)$ is multiplied by the computed first correction coefficient $H_1(s, k)$.

For example, in the case where the correlation value when the code sequence Code #1 is used for the transmission signal is computed, the correction coefficient computation unit ACC computes a ratio of the first correction coefficient $H_1(s, k)=|AC_{1\_}sub_2(s, k+(Nr/N)|/|AC_{1\_}sub_1(s, k)|$. Further, the corrected correlation value computation unit M2 multiplies $AC_{1\_}sub_2(s, k+(Nr/N))$ by the computed first correction coefficient $H_1(s, k)$, and conducts addition processing as represented in Expression (13).

That is, Expression (12) represents, at the discrete time k=1 to (Nr+Nu), that the gains of the AGC units 19 and 20 are made equal to each other when the respective amplitude levels of the sub-code sequence correlation value when the sub-code sequence (c) is used for the transmission signal, and the complex sub-code sequence correlation value when the complex sub-code sequence (jd) is used for the transmission signal are equal to each other. That is, when Expression (12) is satisfied, there is no variation in the gain between the AGC units 19 and 20.

As a result, at the discrete time k=1 to (Nr+Nu), the correction coefficient computation unit ACC can operate the correction coefficient $H_1(s, k)$ for appropriately correcting the amount of phase shift between the I signal and the Q signal, which is caused by displacing the scales of the amplitudes of the I signal and the Q signal due to a variation between the AGC units 19 and 20. With this operation, a measurement performance of the radar can be finally improved (particularly, an angle measurement precision is improved).

[Ex. 12]

$$\text{Amplitude level of } AC_{1\_}sub_2(s, k+Nr/N) = \text{amplitude level of } AC_{1\_}sub_1(s,k) \quad (12)$$

At the discrete time k=1 to (Nr+Nu), the corrected correlation value computation unit M2 multiplies the first correction coefficient $H_1(s, k)$ computed in Step S16 by $AC_{1\_}sub_2(s, k+(Nr/N))$ or $AC_{1\_}sub_1(s, k)$ (S17). In this example, for example, it is assumed that $AC_{1\_}sub_2(s, k+(Nr/N))$ is multiplied by the correction coefficient $H_1(s, k)$. Further, the complementary code sequence correlation value computation unit CC adds the corrected correlation value computation result multiplied in Step S17 and the sub-code sequence correlation value computed according to Expression (8) together, according to Expression (13) (S18). The correlation value computed according to Expression (13) represents the correlation value of the complementary code sequence in the code sequence Code #1.

[Ex. 13]

$$AC_1(s, k) = AC_{1\_}sub_1(s, k) + H_1(s, k)AC_{1\_}sub_2\left(s, k + \frac{Nr}{N}\right) \quad (13)$$

The computations of the complex correlation value computation unit 25 and the IQ correction unit 26 are conducted at the discrete time k=1 to (Nr+Nu) by the respective receiver antennas. On the assumption that an existence area of the target to be measured by the radar apparatus 1 is at a short distance from the radar apparatus 1, a range of the discrete time k may be further restricted. With the restriction, the radar apparatus 1 can reduce the computation of the complex correlation value computation unit 25 and the IQ correction unit 26. That is, the radar apparatus 1 can reduce a power consumption of the signal processor 21.

Also, the correction coefficient computation unit ACC computes a coefficient concerning Expression (10) or Expression (11) when Expression (14) is satisfied, as a second correction coefficient $H_2(s, k)$ (where k=(Nr+Nu+1) to 2(Nr+Nu)), at the discrete time k=(Nr+Nu+1) to 2(Nr+Nu) on the basis of the respective sub-code sequence correlation values and the respective complex sub-code sequence correlation values which are computed according to Expression (10) and Expression (11) (S16).

Specifically, the second correction coefficient $H_2(s, k)$ is computed as a coefficient for making the respective amplitude levels (amplitude scales) of a complex sub-code sequence correlation value $AC_{2\_}sub_2(s, k+(Nr/N))$ when the sub-code sequence is used for the transmission signal, and a complex sub-code sequence correlation value $AC_{2\_}sub_1(s, k)$ when the complex sub-code sequence is used for the transmission signal, equal to each other. The $AC_{2\_}sub_2(s, k+(Nr/N))$ or $AC_{2\_}sub_1(s, k)$ is multiplied by the computed second correction coefficient $H_2(s, k)$.

For example, in the case where the correlation value when the code sequence Code #2 is used for the transmission signal is computed, the correction coefficient computation unit ACC computes a ratio of the second correction coefficient $H_2(s, k)=|AC_{2\_}sub_2(s, k+(Nr/N)|/|AC_{2\_}sub_1(s, k)|$. Further, the corrected correlation value computation unit M1 multiplies $AC_{2\_}sub_2(s, k+(Nr/N))$ by the computed second correction coefficient $H_2(s, k)$, and conducts addition processing as represented in Expression (14).

That is, Expression (14) represents, at the discrete time k=(Nr+Nu+1) to 2(Nr+Nu), that the gains of the AGC units 19 and 20 are made equal to each other when the respective amplitude levels of the complex sub-code sequence correlation value when the complex sub-code sequence (jc) is used for the transmission signal, and the sub-code sequence correlation value when the sub-code sequence (d) is used for the transmission signal are equal to each other. That is, when Expression (14) is satisfied, there is no variation in the gain between the AGC units 19 and 20.

As a result, at the discrete time k=(Nr+Nu+1) to 2(Nr+Nu), the correction coefficient computation unit ACC can operate the correction coefficient $H_2(s, k)$ for appropriately correcting the amount of phase shift between the I signal and the Q signal, which is caused by a variation between the AGC units 19 and 20. With this operation, the measurement performance of the radar can be finally improved (particularly, the angle measurement precision is improved).

[Ex. 14]

$$\text{Amplitude level of } AC_{2\_}sub_2(s, k+Nr/N) = \text{amplitude level of } AC_{2\_}sub_1(s,k) \quad (14)$$

At the discrete time k=(Nr+Nu+1) to 2(Nr+Nu), the corrected correlation value computation unit M1 multiplies the second correction coefficient $H_2(s, k)$ computed in Step S16 by $AC_{2\_}sub_2(s, k+(Nr/N))$ or $AC_{2\_}sub_1(s, k)$ (S17). In this example, for example, it is assumed that $AC_{2\_}sub_2(s, k+(Nr/N))$ is multiplied by the correction coefficient $H_2(s, k)$. Further, the complementary code sequence correlation value computation unit CC adds the corrected correlation value computation result multiplied in Step S17 and the complex sub-code sequence correlation value computed according to Expression (10) together, according to Expression (15) (S18).

The correlation value computed according to Expression (15) represents the correlation value of the complementary code sequence in the code sequence Code #2.

[Ex. 15]

$$AC_2(s, k) = AC_{2\_sub_1}(s, k) + H_2(s, k)AC_{2\_sub_2}\left(s, k + \frac{Nr}{N}\right) \quad (15)$$

The computations of the complex correlation value computation unit 25 and the IQ correction unit 26 are conducted at the discrete time k=(Nr+Nu+1) to 2(Nr+Nu) by the respective receiver antennas. On the assumption that an existence area of the target to be measured by the radar apparatus 1 is at a short distance from the radar apparatus 1, the range of the discrete time k may be further restricted. With the restriction, the radar apparatus 1 can reduce the computation of the complex correlation value computation unit 25 and the IQ correction unit 26. That is, the radar apparatus 1 can reduce a power consumption of the signal processor 21.

The averaging processor 27 adds the correlation value of the complementary code sequence in the code sequence Code #1, which has been computed according to Expression (13), and the correlation value of the complementary code sequence in the code sequence Code #2, which has been computed according to Expression (15). The discrete time k in the computation of the correlation value of the complementary code sequence in the code sequence Code #2 is later by one period of the transmission period Tr than the discrete time k in the computation of the correlation value of the complementary code sequence in the code sequence Code #1.

Taking a difference of the discrete time k in the computation of the correlation value of the complementary code sequence between the respective code sequences into consideration, the averaging processor 27 conducts computation represented by Expression (16) in which the discrete time k in the computation of the correlation value of the complementary code sequence in the code sequence Code #2 is temporally shifted by the transmission period Tr. The correlation value represented by Expression (16) is a correlation value between the complementary code sequences (code sequence Code #1, code sequence Code #2) generated by the transmission signal generator 4, and the received signal received by the received antenna ANTs. In this example, the discrete time k is k=1 to (Nr+Nu). According to the computation of Expression (16) by the averaging processor 27, as represented by the above-mentioned Expression (1) and FIG. 8, the radar apparatus 1 can obtain the signal having the low range sidelobe maintained.

[Ex. 16]

$$AC_1(s,k) + AC_2(s,k+(Nr+Nu)) \quad (16)$$

The arrival angle distance estimator 28 estimates an arrival angle to a target and a range to the target on the basis of a correlation value $AC_1(s, k) + AC_2(s, k+Nr+Na)$ of the complementary code sequences (code sequence Code #1, code sequence Code #2) computed by the averaging processor 27. The estimation computation of the arrival angle by the complex correlation value computation unit 25 is a known technique, and can be realized, for example, by referring to the following reference Non Patent Literature 1. Further, the estimation computation of the range to the target by the arrival angle distance estimator 28 can be realized by referring to the following reference Non Patent Literature 2.

(Reference Non Patent Literature 1) JAMES A. Cadzow, "Direction of Arrival Estimation Using Signal Subspace Modeling", IEEE, Vol. 28, pp. 64-79 (1992)

(Reference Non Patent Literature 2) J. J. BUSSGANG, et al., "A Unified Analysis of Range Performance of CW, Pulse, and Pulse Dopper Radar", Proceedings of the IRE, Vol. 47, Issue 10, pp. 1753-1762 (1959).

For example, the arrival angle distance estimator 28 calculates a level of the received signal in the receiver antenna, for the arrival angle to the target, on the basis of the added correlation value of the complementary code sequences in the receiver antenna ANT1. The level of the received signal includes a phase component of the arrival angle to the target. The arrival angle distance estimator 28 estimates an angle of the phase component when the level of the received signal is a maximum value, as the arrival angle to the target.

Also, for example, the arrival angle distance estimator 28 calculates the range to the target, for the range to the target, on the basis of the added correlation value of the complementary code sequences in the receiver antenna ANT1, on the basis of a time lag between a discrete time when the correlation value is the maximum value, and a transmission time of the radio frequency transmission signal.

With the above configuration, according to the radar apparatus 1 of the first embodiment, the amount of phase shift occurring between the I signal and the Q signal after quadrature detection of the signal of the reflected wave reflected by the target can be appropriately corrected to suppress the deterioration of the estimate precision of the arrival angle to the target.

Also, the radar apparatus 1 can obtain the correlation value having an SNR (signal noise ratio) improved in the signal of the reflected wave reflected by the target because the radio frequency transmission signal is subjected to pulse compression by the code length L/N. For that reason, the radar apparatus 1 can compute the correction coefficient for appropriately correcting the amount of phase shift between the I signal and the Q signal with high precision, and can suppress the estimation deterioration of the arrival angle to the target.

Further, according to the radar apparatus 1, the low range sidelobe characteristics can be held with the use of the complementary code sequences (code sequence Code #1, code sequence Code #2). As a result, the estimation deterioration of the arrival angle and the distance to the target according to the radar apparatus 1 can be suppressed.

Further, according to the radar apparatus 1, the correction coefficient responsive to the variation in the gains of the AGC units 19 and 20 which are varied while being affected by the external environment such as temperature can be computed in real time for a predetermined measurement period.

Modified Example 1 of First Embodiment

In the first embodiment, the complementary code sequence (a, b) is represented as a=[c, jd] and b=[jc, d] with the use of a sub-code sequence (c, d, jc, jd). How to express the complementary code sequence (a, b) is not limited to this manner. For example, when a coefficient (A, B, C, D) is provided for the sub-code sequences c and d, if the complementary code sequence (a, b) is represented as a=[Ac, Bd] and b=[Cc, Dd], the respective coefficients (A, B, C, D)=(1, j, j, 1) is satisfied in the first embodiment. In addition, even if the following respective coefficients are used as the respective coefficients, the same advantages as those in the first embodiment can be obtained.

Specifically, as a first pattern, the complementary code sequence (a, b) is represented as a=[jc, −d] and b=[−c, jd]. In this case, the respective coefficients (A, B, C, D)=(j, −1, −1, j) is satisfied.

Then, as a second pattern, the complementary code sequence (a, b) is represented as a=[−c, −jd] and b=[−jc, −d]. In this case, the respective coefficients (A, B, C, D)=(−1, −j, −j, −1) is satisfied. In this example, −j is an inverted complex sequence.

Then, as a third pattern, the complementary code sequence (a, b) is represented as a=[jc, d] and b=[c, jd]. In this case, the respective coefficients (A, B, C, D)=(j, 1, 1, j) is satisfied.

Then, as a fourth pattern, the complementary code sequence (a, b) is represented as a=[−jc, −d] and b=[−c, −jd]. In this case, the respective coefficients (A, B, C, D)=(−j, −1, −1, −j) is satisfied.

Finally, as a fifth pattern, the complementary code sequence (a, b) is represented as a=[−c, jd] and b=[jc, −d]. In this case, the respective coefficients (A, B, C, D)=(−1, j, j, −1) is satisfied.

Modified Example 2 of First Embodiment

In the description of the first embodiment, the problem that the variation occurs between the gains of the AGC units 19 and 20 in the radar receiver 3 to cause the amount of phase shift between the I signal and the Q signal is solved by the configuration of the radar apparatus 1. However, there has been known that, in not only a case in which the radar receiver 3 has the AGC units 19 and 20, but also a case of a radar apparatus of a direct conversion system in which the radar receiver 3 has none of the AGC units 19 and 20, the amount of phase shift occurs between the I signal and the Q signal after quadrature detection. That is, even in the case of the radar apparatus of the direct conversion system, the amount of phase shift occurs between the I signal and the Q signal after quadrature detection due to an error factor of hardware of the quadrature detector in the receiver RF unit.

Under the circumstances, a modified example 2 of the first embodiment includes the configuration of the radar apparatus of the direct conversion system having no AGC units 19 and 20 in the radar receiver 3 according to the first embodiment. That is, the radar apparatus according to the modified example 2 of the first embodiment includes the same radar transmitter as the radar transmitter 2 of the radar apparatus 1, and has the same configuration as the radar receiver 3 of the radar apparatus 1 except for the AGC units 19 and 20.

According to the radar apparatus of the modified example 2 of the first embodiment, even if the AGC units 19 and 20 are not provided as in the radar apparatus 1 of the first embodiment, the amount of phase shift occurring between the I signal and the Q signal due to an error factor of hardware of the quadrature detector in the receiver RF unit can be appropriately corrected.

Modified Example 3 of First Embodiment

In the first embodiment, the configuration of the transmission signal generator 4 in the radar apparatus 1 is illustrated in FIG. 1. However, the radar transmitter in the radar apparatus according to the present invention is not limited to the transmission signal generator 4 in the first embodiment.

Under the circumstances, in a modified example 3 of the first embodiment, the radar transmitter of the radar apparatus includes the configuration of a transmission signal generator 4a illustrated in FIG. 7(a), or a transmission signal generator 4b illustrated in FIG. 7(b), instead of the transmission signal generator 4 of the radar apparatus 1 in the first embodiment. A radar receiver in the radar apparatus according to the modified example 3 of the first embodiment is identical with that of the radar apparatus 1 in the first embodiment. For that reason, the description of the radar receiver in the radar apparatus according to the modified example 3 of the first embodiment will be omitted.

Figure 7:
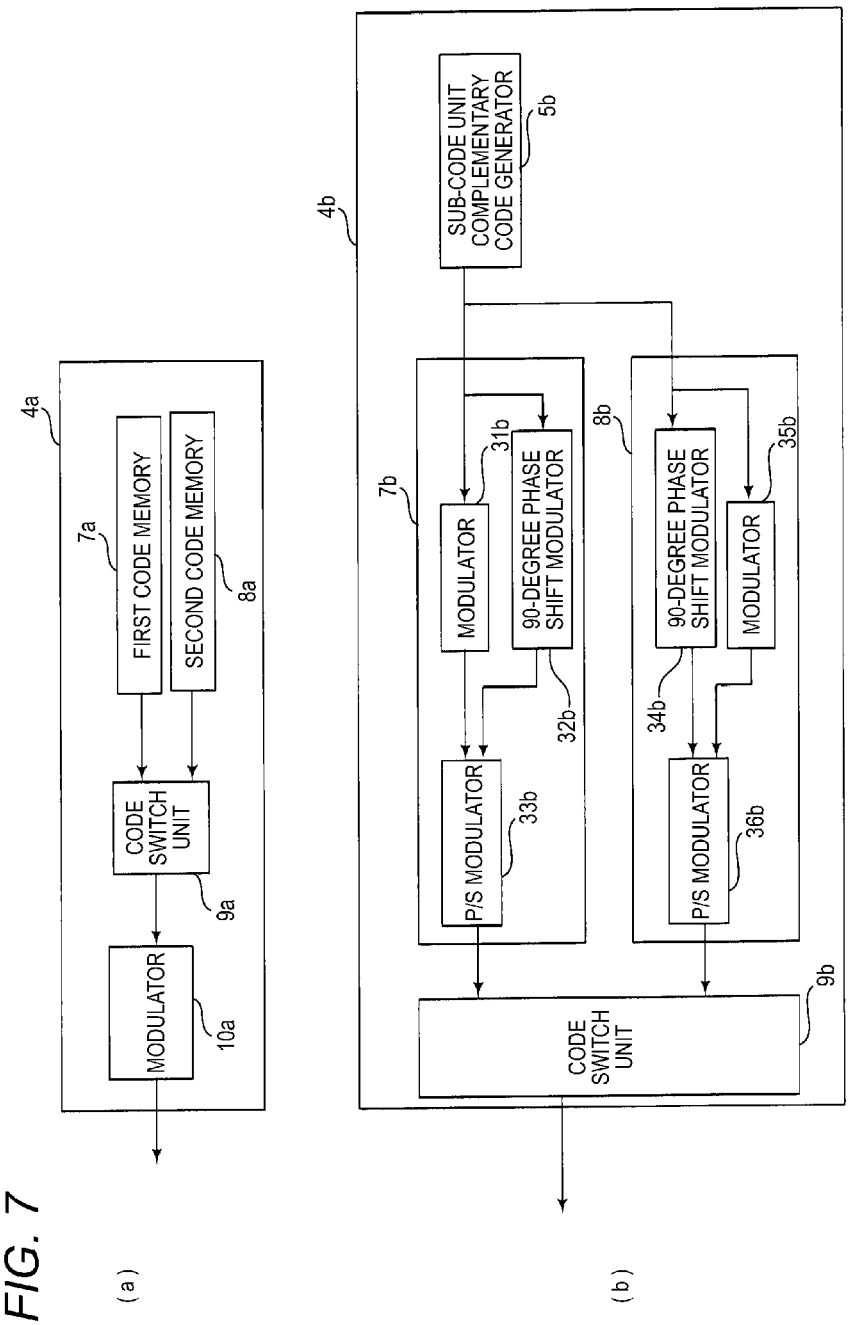
FIG. 7 is block diagrams illustrating another internal configuration of a transmission signal generator, in which FIG. 7($a$) is a block diagram illustrating an internal configuration of a modified example of the transmission signal generator, and FIG. 7($b$) is a block diagram illustrating an internal configuration of another modified example of the transmission signal generator.

FIG. 7 is block diagrams illustrating another internal configuration of the transmission signal generator. FIG. 7(a) is a block diagram illustrating an internal configuration of the transmission signal generator 4a which is a modified example of the transmission signal generator 4. FIG. 7(b) is a block diagram illustrating an internal configuration of the transmission signal generator 4b which is another modified example of the transmission signal generator 4.

As illustrated in FIG. 7(a), the transmission signal generator 4a includes a first code memory 7a, a second code memory 8a, a code switch unit 9a, and a modulator 10a. The first code memory 7a stores a sub-code sequence generated by the first code generator 7 in the radar apparatus 1 of the first embodiment in advance. Likewise, the second code memory 8a stores a sub-code sequence generated by the second code generator 8 in the radar apparatus 1 of the first embodiment in advance.

The code switch unit 9a generates a timing clock obtained by multiplying the reference signal by a given multiple number on the basis of the reference signal generated by the local oscillator Lo. The code switch unit 9a reads the sub-code sequence stored in the first code memory 7a or the second code memory 8a on the basis of the generated timing clock. The operation of the code switch unit 9a after reading and the operation of the modulator 10a are identical with the operation of the code switch unit 9 and the operation of the modulator 10 in the transmission signal generator 4 of the first embodiment, and therefore a description of the same contents will be omitted.

As illustrated in FIG. 7(b), the transmission signal generator 4b includes a sub-code unit complementary code generator 5b, a first code generator 7b, a second code generator 8b, and a code switch unit 9b. Also, the first code generator 7b includes a modulator 31b, a 90-degree phase shift modulator 32b, and a P/S modulator 33b. Likewise, the second code generator 8b includes a 90-degree phase shift modulator 34b, a modulator 35b, and a P/S modulator 36b.

The sub-code unit complementary code generator 5b generates the sub-code sequence (c) as in the sub-code unit complementary code generator 5 of the first embodiment, and outputs the generated sub-code sequence (c) to the modulator 31b that conducts modulation, for example, by the I-axis (in-phase axis). Also, the sub-code unit complementary code generator 5b generates the sub-code sequence (d) as in the sub-code unit complementary code generator 5 of the first embodiment, and outputs the generated sub-code sequence (d) to the 90-degree phase shift modulator 32b that conducts modulation, for example, by the Q-axis (orthogonal axis).

The sub-code unit complementary code generator 5b generates the sub-code sequence (c) as in the sub-code unit complementary code generator 5 of the first embodiment, and outputs the generated sub-code sequence (c) to the 90-degree phase shift modulator 34b that conducts modulation, for example, by the Q-axis (in-phase axis). Also, the sub-code unit complementary code generator 5b generates the sub-code sequence (d) as in the sub-code unit complementary code generator 5 of the first embodiment, and outputs the generated sub-code sequence (d) to the modulator 35b that conducts modulation, for example, by the I-axis (in-phase axis).

The modulator 31b receives the sub-code sequence (c) generated by the sub-code unit complementary code generator 5b, and modulates the sub-code sequence (c) by the I-axis (in-phase axis), and outputs the modulated signal to the P/S modulator 33b.

The 90-degree phase shift modulator 32b receives the sub-code sequence (d) generated by the sub-code unit complementary code generator 5b, modulates the sub-code sequence (d) by the Q-axis (orthogonal axis), and outputs the modulated signal to the P/S modulator 33b. That the 90-degree phase shift modulator 32b modulates the sub-code sequence (d) by the Q-axis corresponds to that the complex coefficient j is multiplied by the complex coefficient multiplier 6 of the transmission signal generator 4 in the first embodiment.

The P/S modulator 33b receives a signal output from the modulator 31b and a signal output from the 90-degree phase shift modulator 32b. The P/S modulator 33b outputs the signal output from the modulator 31b to the code switch unit 9b, and thereafter outputs the signal output from the 90-degree phase shift modulator 32b to the code switch unit 9b. This operation is identical with the operation of outputting the code sequence [c, jd] to the code switch unit 9 in the first code generator 7 of the first embodiment.

The 90-degree phase shift modulator 34b receives the sub-code sequence (c) generated by the sub-code unit complementary code generator 5b, modifies the sub-code sequence (c) by the Q-axis (orthogonal axis), and outputs the modulated signal to the P/S modulator 36b. That the 90-degree phase shift modulator 34b modulates the sub-code sequence (c) by the Q-axis corresponds to that the complex coefficient j is multiplied by the complex coefficient multiplier 6 of the transmission signal generator 4 in the first embodiment.

The modulator 35b receives the sub-code sequence (d) generated by the sub-code unit complementary code generator 5b, modifies the sub-code sequence (d) by the I-axis (in-phase axis), and outputs the modulated signal to the P/S modulator 36b.

The P/S modulator 36b receives the signal output from the 90-degree phase shift modulator 34b, and the signal output from the modulator 35b. The P/S modulator 36b outputs the signal output from the 90-degree phase shift modulator 34b to the code switch unit 9b, and thereafter outputs the signal output from the modulator 35b to the code switch unit 9b. This operation is identical with the operation of outputting the code sequence [jc, d] to the code switch unit 9 in the first code generator 7 of the first embodiment.

The code switch unit 9b sequentially switches the signal output from the first code generator 7b, that is, the modulated code sequence Code #1, and the signal output from the second code generator 8b, that is, the modulated code sequence Code #2, and successively switches and outputs to the modulator 10 for each transmission period as illustrated in FIG. 3(c).

With the above configuration, the radar apparatus according to the modified example 3 of the first embodiment can provide an alternative configuration of the transmission signal generator 4 in the first embodiment. Specifically, in the transmission signal generator 4a of the radar apparatus according to the modified example of the first embodiment, the configuration of the transmission signal generator 4b can be simplified.

Modified Example 4 of First Embodiment

In the description of the first embodiment, the amount of phase shift occurring between the I signal and the Q signal, which is caused by the variation of the gains between the AGC units 19 and 20 can be appropriately corrected by the IQ correction unit 26 of the signal processor 21 to suppress the deterioration of the estimate precision of the arrival angle to the target.

In a modified example 4 of the first embodiment, the amount of phase rotation associated by the movement of the target is measured on the basis of the correlation value represented by the above-mentioned Expression (16), which has been added by the averaging processor 27 of the first embodiment to estimate the Doppler frequency.

Figure 8:
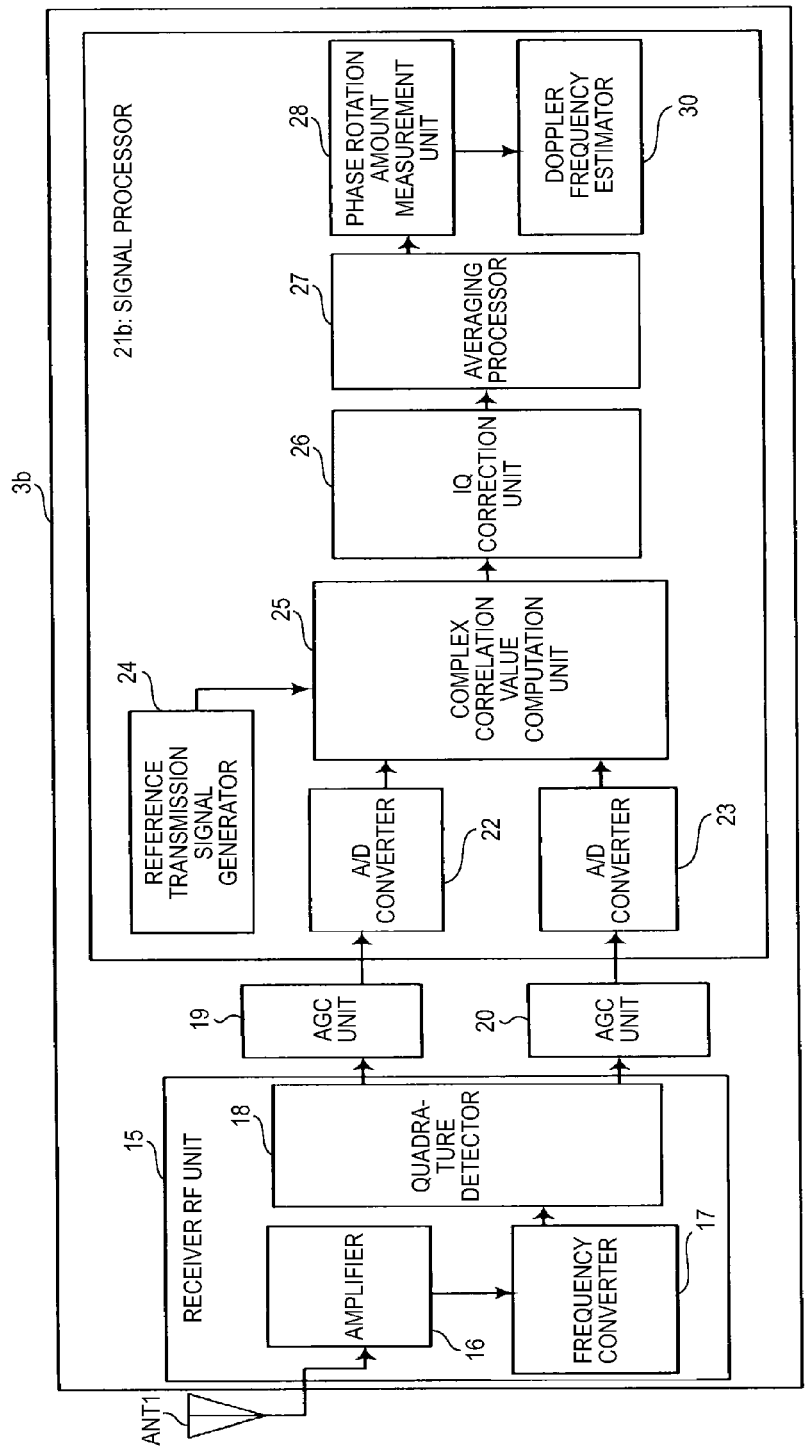
FIG. 8 is a block diagram illustrating an internal configuration of a radar receiver according to a modified example of the first embodiment.
Figure 9:
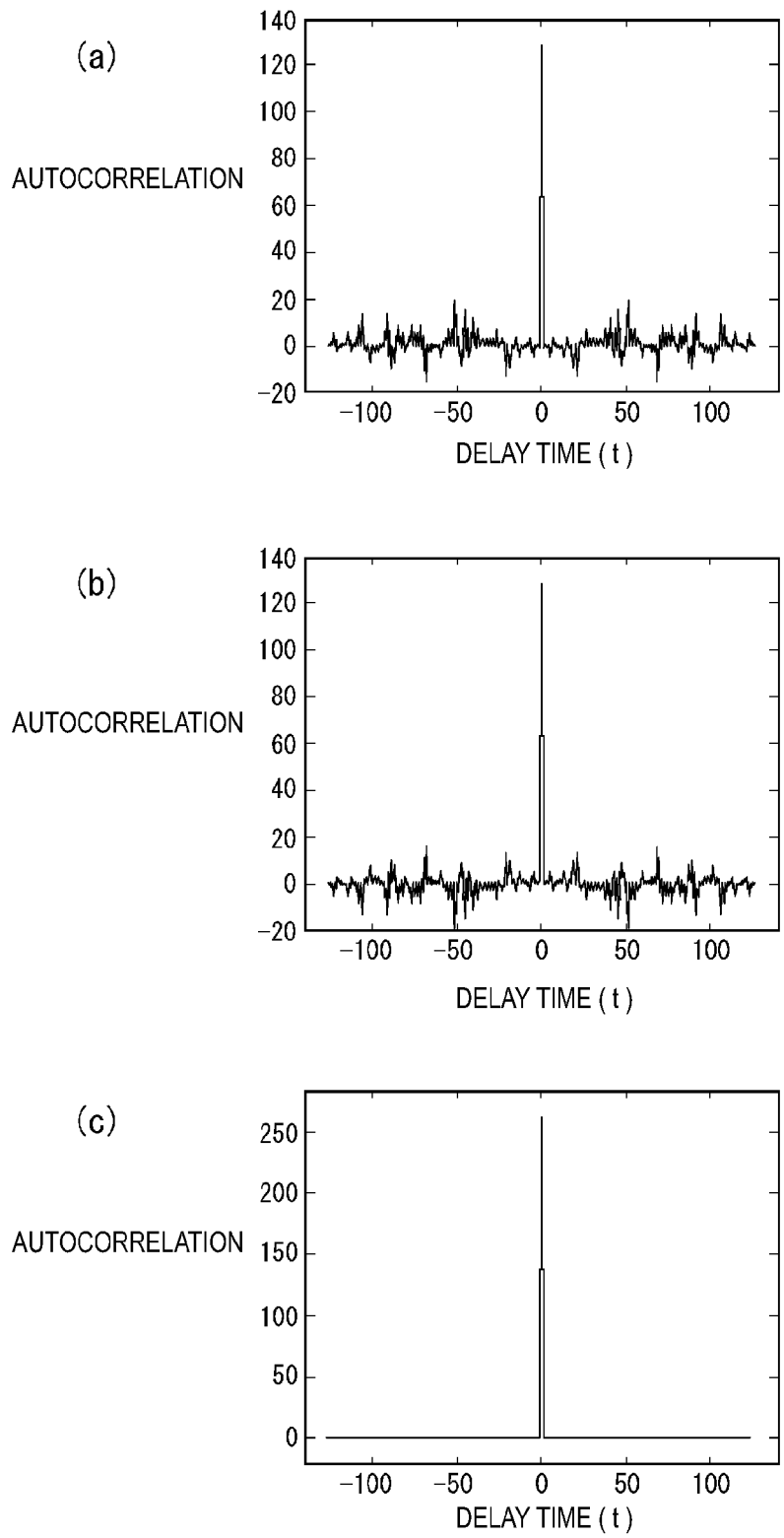
FIG. 9 is illustrative views illustrating a property of a conventional complementary code, in which FIG. 9($a$) is an illustrative view illustrating an autocorrelation computation result of one complementary code sequence, FIG. 9($b$) is an illustrative view illustrating an autocorrelation computation result of the other complementary code sequence, and FIG. 9($c$) is an illustrative view illustrating an added value of the autocorrelation computation results of the two complementary code sequences.
Figure 10:
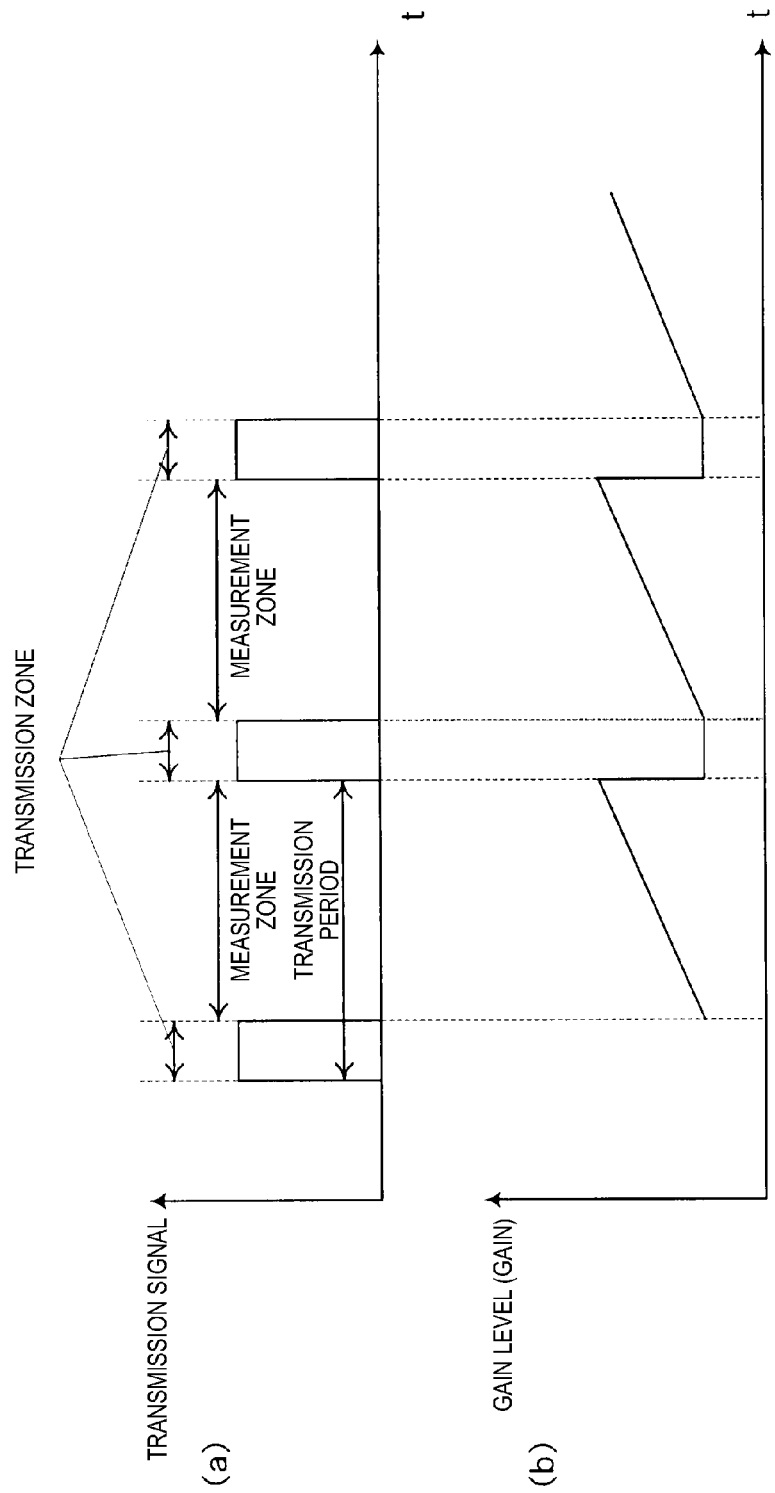
FIG. 10 is illustrative views illustrating the operation of amplifying a signal of a reflected wave in a conventional radar apparatus, in which FIG. 10($a$) is an illustrative view illustrating a transmission zone of the transmission signal and a measurement zone of a received signal, and FIG. 10($b$) is an illustrative view illustrating a change in a gain amplified by an AGC unit within a measurement zone of the received signal.
Figure 11:
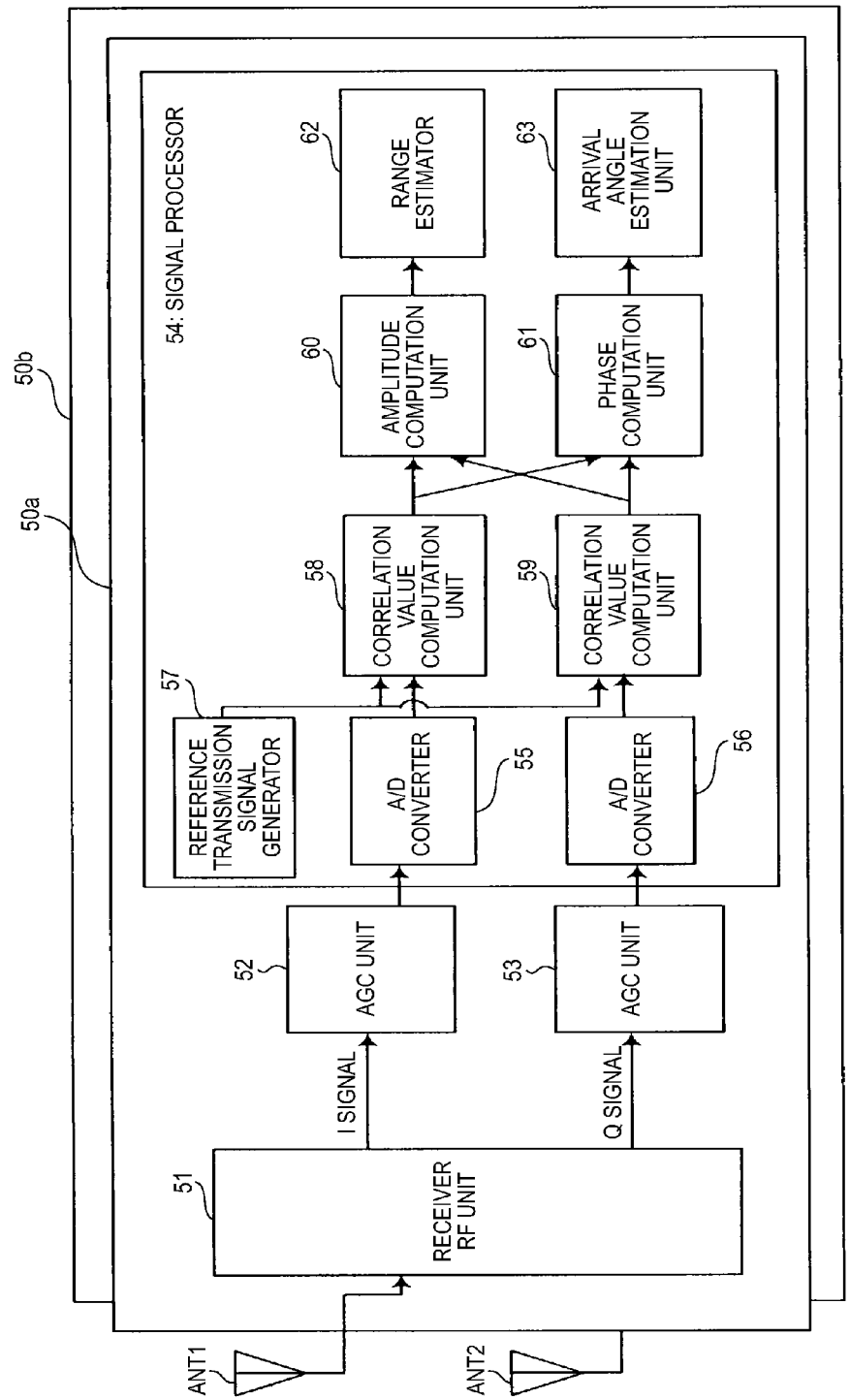
FIG. 11 is a block diagram illustrating an internal configuration of a radar receiver according to the conventional radar apparatus.
Figure 12:
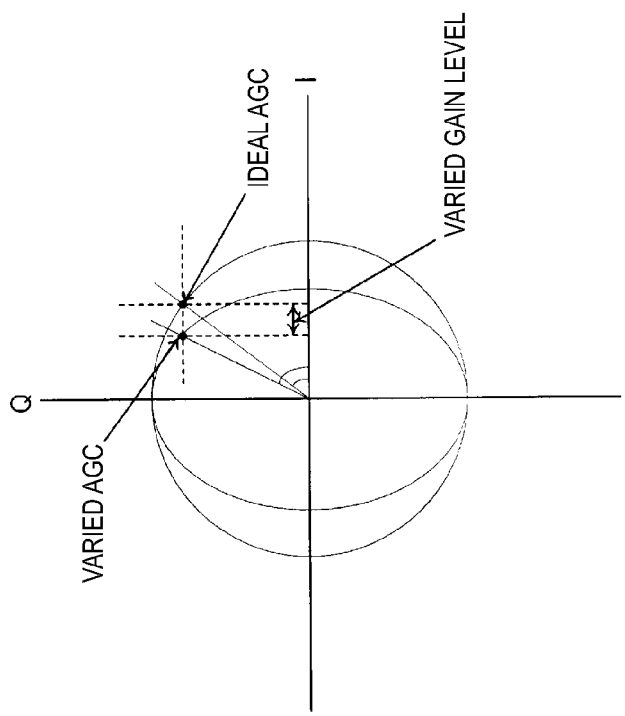
FIG. 12 is an illustrative view illustrating an influence of a variation in the gain of the AGC unit in the conventional radar apparatus.

FIG. 8 is a block diagram illustrating an internal configuration of a radar receiver 3b according to the modified example 4 of the first embodiment. As illustrated in FIG. 8, the radar receiver 3b includes the receiver antenna ANT1, the receiver RF unit 15, the AGC unit 19, the AGC unit 20, and a signal processor 21b. The signal processor 21b includes the A/D converter 22, the A/D converter 23, the reference transmission signal generator 24, the complex correlation value computation unit 25, the IQ correction unit 26, the averaging processor 27, a phase rotation amount measurement unit 29, and a Doppler frequency estimator 30. In the signal processor 21b of the radar receiver 3b, the other configurations except for the phase rotation amount measurement unit 29 and the Doppler frequency estimator 30 are identical with those of the radar apparatus 1 according to the first embodiment, and therefore a description of the same units will be omitted.

The phase rotation amount measurement unit 29 measures a phase rotation amount $\Delta\theta(k)$ on the basis of the correlation value of the complementary code sequence in each transmission period over a plurality of transmission periods $N_{Tx}$ as the correlation value of the complementary code sequence, which has been computed by the averaging processor 27, as a reference value. The phase rotation amount measurement unit 29 outputs the measured phase rotation amount $\Delta\theta(k)$ to the Doppler frequency estimator 30.

The Doppler frequency estimator 30 computes the phase rotation amount associated with the movement of the target, that is, a Doppler frequency $f_d(k)$ according to Expression (17), on the basis of the phase rotation amount $\Delta\theta(k)$ output from the phase rotation amount measurement unit 29. A parameter NTx is an observation time [sec] of the correlation value of the complementary code sequence, which has been added by the averaging processor 27.

[Ex. 17]

$$fd(k) = \frac{\Delta\theta(k)}{2\pi N_{Tx} * (2Tr)} \qquad (17)$$

With the above configuration, according to the radar apparatus of the modified example 4 of the first embodiment, the phase rotation amount and the Doppler frequency which are associated with the movement of the target can be estimated with high precision, on the basis of the correlation value of the complementary code sequence, which has been computed by the averaging processor 27.

The variety of embodiments has been described above with reference to the accompanying drawings. However, it is needless to say that the radar apparatus of the present invention is not limited to the above examples. The ordinary skilled person in the art could obviously conceive various changes or modifications without departing from the scope of the claims, and it should be considered that those changes or modifications fall within the technical scope of the present invention.

In the description of the above-mentioned first embodiment, the averaging processor 27 can obtain the low range sidelobe characteristics with the addition result of the correlation value for the transmission period which is double as long as the transmission period Tr of the radio frequency transmission signal as one unit. However, the averaging processor 27 may further compute the addition result of the correlation value for the double transmission period over a plurality of transmission periods, and average the computed addition results of the correlation value in the double transmission period. With this configuration, the radar apparatus can obtain the received signal having the noise signal further suppressed. That is, the computation for estimating the arrival angle and the range to the target can be conducted with high precision.

In the first embodiment, the A/D converters 22 and 23 convert the I signal and the Q signal of the baseband bandwidth, which have been amplified by the AGC units 19 and 20 into digital data at over-sampling corresponding to the discrete time k. However, in the radar receivers 3 and 3a, there is no need to conduct A/D conversion at the same sampling rate as that of the transmission signal of the baseband bandwidth in the radar transmitter 2.

For example, in the radar transmitter 2 according to the first embodiment, the transmission signal of the baseband bandwidth is generated by with the use of the number of sampling Nr for the code length L. This corresponds to the oversampling of the Nr/L samples per one code. However, in the radar receivers 3 and 3a, if one or more samples are provided for one code, signal processing of the received signal can be conducted.

The present invention is based on Japanese Patent Application No. 2010-170821 filed on Jul. 29, 2010, and the contents of which are incorporated herein by reference.

INDUSTRIAL APPLICABILITY

The radar apparatus according to the present invention is useful as the radar apparatus that appropriately correct the amount of phase shift occurring between the I signal and the Q signal after quadrature detection of the signal reflected by the target to suppress the deterioration of the estimate precision of the arrival angle to the target.

REFERENCE SIGNS LIST 1, radar apparatus
2, radar transmitter
3, 3a, radar receiver
4, 4a, 4b, transmission signal generator
5, 5b, sub-code unit complementary code generator
6, complex coefficient multiplier
7, 7b, first code generator
8, 8b, second code generator
7a, first code memory
8a, second code memory
9, 9a, 9b, code switch unit
10, 10a, 31b, 35b, modulator
11, LPF
12, transmitter RF unit
13, 17, frequency converter
14, 16, power amplifier
15, receiver RF unit
18, quadrature detector
19, 20, AGC unit
21, 21b, signal processor
22, 23, A/D converter
24, reference transmission signal generator
25, complex correlation value computation unit
26, IQ correction unit
27, averaging processor
28, arrival angle distance estimator
29, phase rotation amount measurement unit
30, Doppler frequency estimator
32b, 34b, 90-degree phase shift modulator
33b, 36b, P/S modulator
ACC, correction coefficient computation unit
ANT0, transmitter antenna
ANT1, ANT2, receiver antenna
B1, B2, B3, B4, buffer
CC, complementary code sequence correlation value computation unit
FR, first sub-code unit correlation value computation unit
Lo, local oscillator
M1, M2, corrected correlation value computation unit
R1, R2, R3, R4, R5, R6, R7, R8, shift register
SR, second sub-code unit correlation value computation unit
Tr, transmission period
Tw, transmission zone

The invention claimed is:

1. A radar apparatus which transmits a radio frequency transmission signal from a transmitter antenna in a predetermined transmission period, and receives a signal of a reflected wave reflected by a target via a receiver antenna, comprising:

a transmission signal generator that generates a first transmission signal obtained by modifying a code having a third sub-code sequence and a fourth sub-code sequence coupled to each other in a first transmission period, and generates a second transmission period obtained by modifying a code having a fifth sub-code sequence and a sixth sub-code sequence coupled to each other in a second transmission period, among first and second sub-code sequences each having a sub-code length obtained by dividing equally a code sequence having a predetermined code length, and third, fourth, fifth, and sixth sub-code sequences obtained by multiplying each of the first and second sub-code sequences by two kinds of different coefficients including a complex coefficient; and a RF transmitter that converts the first and second transmission signals generated by the transmission signal generator into radio frequency transmission signals, and transmits the radio frequency transmission signals from the transmitter antenna.

2. The radar apparatus according to claim 1, further comprising:

a RF receiver that converts the signal of the reflected wave received by the receiver antenna into a received signal of a baseband bandwidth;

a reference transmission signal generator that generates first and second reference transmission signals including the same third, fourth, fifth, and sixth sub-code sequences as those of the transmission signals generated by the transmission signal generator in synchronism with the first transmission period or the second transmission period;

a complex correlation value calculator that computes, in the first transmission period, a first correlation value between a first received signal and the third sub-code sequence included in the first reference transmission signal, and a second correlation value between the first received signal and the fourth sub-code sequence included in the first reference transmission signal, and computes, in the second transmission period, a third correlation value between a second received signal and the fifth sub-code sequence included in the second reference transmission signal, and a fourth correlation value between the second received signal and the sixth sub-code sequence included in the second reference transmission signal; and an IQ corrector that computes a first correction coefficient for making the first correlation value and the second correlation value equal to each other, computes a second correction coefficient for making the third correlation value and the fourth correlation value equal to each other, computes a fifth correlation value obtained by adding the first correlation value and the second correlation value which are corrected by using the first correction coefficient, and computes a sixth correlation value obtained by adding the third correlation value and the fourth correlation value which are corrected by using the second correction coefficient.

3. The radar apparatus according to claim 2, further comprising:

an averaging processor that shifts the second transmission period in the computation of the sixth correlation value to the first transmission period in the computation of the fifth correlation value, and adds the shifted sixth correlation value and the shifted fifth correlation value together, on the basis of the fifth correlation value and the sixth correlation value which are computed by the IQ corrector.

4. The radar apparatus according to claim 3, further comprising:

an arrival angle distance estimator that operates a phase components corresponding to the maximum level of the received signal calculated based on the addition result of the averaging processor as the arrival angle, or that operates a difference between the transmission timing of the transmission signal and the discrete time corresponding to the maximum value of the addition result of the averaging processor as a range to the target.

5. The radar apparatus according to claim 1, further comprising:

a first A/D converter that converts the in-phase signal amplified by a first AGC into digital data; and a second A/D converter that converts the quadrature signal amplified by a second AGC into digital data.

6. The radar apparatus according to claim 1, further comprising:

a first code sequence storage that stores a code sequence having the third sub-code sequence and the fourth sub-code sequence coupled with each other therein; and a second code sequence storage that stores a code sequence having the fifth sub-code sequence and the sixth sub-code sequence coupled with each other therein, wherein the transmission signal generator modulates the respective code sequences stored in the first and second code sequence storages to generate the transmission signals.

7. The radar apparatus according to claim 3, further comprising:

a phase rotation amount calculator that measures a phase rotation amount in the signal of the reflected wave with movement of the target, on the basis of the added correlation value in a plurality of reference transmission periods, with the first transmission period and the second transmission period in the computation of the correlation value added by the averaging processor as the reference transmission periods; and a Doppler frequency estimator that estimates a Doppler frequency occurring in the signal of the reflected wave with the movement of the target, on the basis of the phase rotation amount computed by the phase rotation amount calculator.

8. The radar apparatus according to claim 1, wherein the code sequence having the given code length is a complementary code.

9. The radar apparatus according to claim 1, wherein the coefficient to be multiplied for the third sub-code sequence is 1;

wherein the coefficient to be multiplied for the fourth sub-code sequence is a complex sequence j;

wherein the coefficient to be multiplied for the fifth sub-code sequence is the complex sequence j; and wherein the coefficient to be multiplied for the sixth sub-code sequence is 1.

10. The radar apparatus according to claim 1, wherein the coefficient to be multiplied for the third sub-code sequence is a complex sequence j;

wherein the coefficient to be multiplied for the fourth sub-code sequence is −1;

wherein the coefficient to be multiplied for the fifth sub-code sequence is −1; and wherein the coefficient to be multiplied for the sixth sub-code sequence is the complex sequence j.

11. The radar apparatus according to claim 1, wherein the coefficient to be multiplied for the third sub-code sequence is −1;

wherein the coefficient to be multiplied for the fourth sub-code sequence is a complex sequence −j;

wherein the coefficient to be multiplied for the fifth sub-code sequence is the complex sequence −j; and wherein the coefficient to be multiplied for the sixth sub-code sequence is −1.

12. The radar apparatus according to claim 1, wherein the coefficient to be multiplied for the third sub-code sequence is a complex sequence j;

wherein the coefficient to be multiplied for the fourth sub-code sequence is 1;

wherein the coefficient to be multiplied for the fifth sub-code sequence is 1; and wherein the coefficient to be multiplied for the sixth sub-code sequence is the complex sequence j.

13. The radar apparatus according to claim 1, wherein the coefficient to be multiplied for the third sub-code sequence is a complex sequence −j;

wherein the coefficient to be multiplied for the fourth sub-code sequence is −1;

wherein the coefficient to be multiplied for the fifth sub-code sequence is −1; and wherein the coefficient to be multiplied for the sixth sub-code sequence is the complex sequence −j.

14. The radar apparatus according to claim 1, wherein the coefficient to be multiplied for the third sub-code sequence is −1;

wherein the coefficient to be multiplied for the fourth sub-code sequence is a complex sequence j;

wherein the coefficient to be multiplied for the fifth sub-code sequence is the complex sequence j; and wherein the coefficient to be multiplied for the sixth sub-code sequence is −1.

* * * * *